US009970387B2

(12) United States Patent
Frank et al.

(10) Patent No.: US 9,970,387 B2
(45) Date of Patent: May 15, 2018

(54) VARIABLE AREA FAN NOZZLE WITH BYPASS FLOW

(75) Inventors: Joel Hudson Frank, San Diego, CA (US); Norman John James, San Diego, CA (US); Shunshen Richard Wang, Chula Vista, CA (US); Bryant Lynoel McKleny, San Diego, CA (US); David A. Baer, San Diego, CA (US); Tony Jones, Northfield (GB); John H. Harvey, Wolverhampton (GB); Peter W. Bacon, Wolverhampton (GB); Mark Hubberstey, Wolverhampton (GB); Brett J. Wharton, Wednesbury (GB); Neil C. Davies, Much Wenlock (GB); Stephen Michael Roberts, Boulder, CO (US); Steven Andrew Wylie, San Diego, CA (US)

(73) Assignees: ROHR, INC., Chula Vista, CA (US); GOODRICH ACTUATION SYSTEMTS LIMITED (GB)

( * ) Notice: Subject to any disclaimer, the term of this patent is extended or adjusted under 35 U.S.C. 154(b) by 1731 days.

(21) Appl. No.: 12/672,565

(22) PCT Filed: Aug. 7, 2008

(86) PCT No.: PCT/US2008/072448
§ 371 (c)(1),
(2), (4) Date: Aug. 30, 2011

(87) PCT Pub. No.: WO2009/029401
PCT Pub. Date: Mar. 5, 2009

(65) Prior Publication Data
US 2011/0296813 A1  Dec. 8, 2011

Related U.S. Application Data

(60) Provisional application No. 60/954,756, filed on Aug. 8, 2007.

(51) Int. Cl.
*F02K 1/72* (2006.01)
*F02K 1/76* (2006.01)
(Continued)

(52) U.S. Cl.
CPC ............... *F02K 1/763* (2013.01); *F02K 1/09* (2013.01); *F02K 1/30* (2013.01); *F02K 1/72* (2013.01);
(Continued)

(58) Field of Classification Search
CPC ... F02K 3/06; F02K 1/763; F02K 1/09; F02K 1/30; F02K 1/72; F02K 1/06; F02K 1/54;
(Continued)

(56) References Cited

U.S. PATENT DOCUMENTS 2,487,588 A * 11/1949 Price .................. F01D 5/085
239/127.3
2,950,595 A   8/1960 Laucher et al.
(Continued)

FOREIGN PATENT DOCUMENTS

CN    1492129    4/2004
CN    1519170    8/2004
(Continued)

OTHER PUBLICATIONS

Official Action for U.S. Appl. No. 12/419,080, dated Mar. 23, 2012, 12 pgs.
(Continued)

*Primary Examiner* — Gerald L Sung
*Assistant Examiner* — Alain Chau
(74) *Attorney, Agent, or Firm* — Snell & Wilmer LLP

(57) ABSTRACT

The exit area of a nozzle assembly is varied by translating a ring assembly located at a rear of the engine nacelle. The ring may be axially translatable along the axis of the engine. As the ring translates, the trailing edge of the ring defines a
(Continued)

variable nozzle exit area. Translation of the ring creates an upstream exit at a leading edge of the ring assembly. The upstream exit can be used to bleed or otherwise spill flow excess from the engine bypass duct. As the engine operates in various flight conditions, the ring can be translated to obtain lower fan pressure ratios and thereby increase the efficiency of the engine. Fairings partially enclose actuator components for reduced drag.

13 Claims, 30 Drawing Sheets

(51) Int. Cl.
　　F02K 1/30　　(2006.01)
　　F02K 3/06　　(2006.01)
　　F02K 1/09　　(2006.01)
(52) U.S. Cl.
　　CPC ............ *F02K 3/06* (2013.01); *F05D 2250/34* (2013.01); *Y10T 74/18576* (2015.01); *Y10T 74/18648* (2015.01)
(58) Field of Classification Search
　　CPC ..... F02K 1/64; F02K 1/76; F02K 1/08; F02K 1/008; Y10T 74/18576; Y10T 74/18648; F05D 2250/34
　　USPC ..... 60/770, 771, 39.5, 796, 798, 226.2, 230; 239/265.11, 265.13, 265.19, 265.27, 239/265.31, 265.23, 265.29; 244/53 R, 244/54, 110 B
　　See application file for complete search history.

(56) References Cited

U.S. PATENT DOCUMENTS

| | | | |
|---|---|---|---|
| 3,024,605 A * | 3/1962 | Nash | 239/265.19 |
| 3,109,284 A * | 11/1963 | Ashwood | F02K 1/09 239/265.17 |
| 3,262,270 A * | 7/1966 | Beavers | F02K 1/72 239/265.19 |
| 3,360,308 A | 12/1967 | Grabowski et al. | |
| 3,404,581 A | 10/1968 | Kraus | |
| 3,460,762 A * | 8/1969 | Weise | 239/265.29 |
| 3,511,055 A * | 5/1970 | Timms | 60/229 |
| 3,572,463 A * | 3/1971 | Eschenburg | F02K 1/40 181/215 |
| 3,665,709 A * | 5/1972 | Medawar | F02K 1/72 60/226.2 |
| 3,747,341 A | 7/1973 | Davis | |
| 3,779,010 A | 12/1973 | Chamay et al. | |
| 3,797,785 A * | 3/1974 | Baerresen et al. | 244/53 R |
| 3,820,719 A * | 6/1974 | Clark | F02K 1/09 239/265.31 |
| 3,981,450 A * | 9/1976 | McCardle et al. | 239/265.31 |
| 4,145,877 A * | 3/1979 | Montgomery | F02K 1/72 60/226.2 |
| 4,337,868 A | 7/1982 | Gattu | |
| 4,375,276 A | 3/1983 | Konarski | |
| 4,407,120 A | 10/1983 | Timms | |
| 4,442,987 A * | 4/1984 | Legrand | B64D 29/08 239/265.25 |
| 4,519,561 A | 5/1985 | Timms | |
| 4,521,707 A | 6/1985 | Baker | |
| 4,682,930 A | 7/1987 | Hachisu | |
| 4,807,434 A * | 2/1989 | Jurich | F02K 1/72 239/265.29 |
| 4,922,713 A * | 5/1990 | Barbarin | F02K 1/72 239/265.31 |
| 5,050,803 A * | 9/1991 | Wakeman et al. | 239/265.35 |
| 5,090,197 A | 2/1992 | Dubois | |
| 5,174,502 A * | 12/1992 | Lippmeier et al. | 239/265.41 |
| 5,181,676 A | 1/1993 | Lair | |
| 5,209,057 A * | 5/1993 | Remlaoui | 60/226.2 |
| 5,211,008 A | 5/1993 | Fage | |
| 5,228,641 A | 7/1993 | Remlaoui | |
| 5,285,637 A * | 2/1994 | Barcza | 239/265.35 |
| 5,297,387 A | 3/1994 | Carimali et al. | |
| 5,313,788 A * | 5/1994 | Wright et al. | 60/226.2 |
| 5,328,098 A * | 7/1994 | Barcza et al. | 239/265.35 |
| 5,404,714 A | 4/1995 | Davies | |
| 5,547,130 A | 8/1996 | Davies | |
| 5,575,147 A | 11/1996 | Nikkanen | |
| 5,655,360 A | 8/1997 | Butler | |
| 5,778,659 A * | 7/1998 | Duesler et al. | 60/226.1 |
| 5,806,302 A | 9/1998 | Cariola | |
| 5,833,140 A | 11/1998 | Loffredo | |
| 5,937,699 A | 8/1999 | Garrec | |
| 5,960,626 A | 10/1999 | Baudu et al. | |
| 5,996,937 A | 12/1999 | Gonidec et al. | |
| 6,079,201 A | 6/2000 | Jean | |
| 6,167,694 B1 | 1/2001 | Davies | |
| 6,170,254 B1 | 1/2001 | Cariola | |
| 6,199,772 B1 * | 3/2001 | Renggli | F02K 1/008 239/265.19 |
| 6,318,070 B1 | 11/2001 | Rey et al. | |
| 6,389,915 B1 | 5/2002 | Wngett | |
| 6,435,048 B1 | 8/2002 | Zimmerman | |
| 6,474,059 B2 | 11/2002 | Stretton | |
| 6,487,845 B1 * | 12/2002 | Modglin et al. | 60/226.2 |
| 6,513,398 B1 | 2/2003 | Finkemeyer | |
| 6,584,763 B2 | 7/2003 | Lymons et al. | |
| 6,625,972 B1 * | 9/2003 | Sternberger | 60/226.2 |
| 6,681,559 B2 | 1/2004 | Johnson | |
| 6,751,944 B2 | 6/2004 | Lair | |
| 6,824,101 B2 * | 11/2004 | Sternberger et al. | 244/110 B |
| 6,845,945 B1 | 1/2005 | Smith | |
| 6,895,742 B2 | 5/2005 | Lair et al. | |
| 6,945,031 B2 | 9/2005 | Lair | |
| 6,966,175 B2 | 11/2005 | Lair | |
| 6,968,675 B2 | 11/2005 | Ramlaoui | |
| 6,971,229 B2 | 12/2005 | Lair | |
| 6,976,352 B2 | 12/2005 | Lair | |
| 7,007,454 B2 | 3/2006 | Dehu et al. | |
| 7,010,905 B2 | 3/2006 | Lair | |
| 7,093,793 B2 | 8/2006 | Lair | |
| 7,096,661 B2 * | 8/2006 | Bush et al. | 60/232 |
| 7,127,880 B2 | 10/2006 | Lair et al. | |
| 7,146,796 B2 | 12/2006 | Lair | |
| 7,174,828 B2 | 2/2007 | Davies | |
| 7,185,868 B2 | 3/2007 | Wang | |
| 7,264,203 B2 | 9/2007 | Lair | |
| 7,818,958 B2 | 10/2010 | Bulin et al. | |
| 8,006,479 B2 | 8/2011 | Stern | |
| 8,104,261 B2 * | 1/2012 | Marshall | F02K 1/09 239/265.19 |
| 8,127,531 B2 * | 3/2012 | Parham | 60/226.3 |
| 8,127,532 B2 * | 3/2012 | Howe | 60/226.3 |
| 8,733,080 B2 | 5/2014 | Jones et al. | |
| 2002/0162410 A1 | 11/2002 | Zimmerman | |
| 2004/0079073 A1 | 4/2004 | Ramlaoui et al. | |
| 2004/0195432 A1 | 10/2004 | Christensen | |
| 2005/0188676 A1 | 9/2005 | Lair | |
| 2005/0204742 A1 | 9/2005 | Lair | |
| 2007/0294996 A1 | 12/2007 | Stephan et al. | |
| 2008/0000235 A1 | 1/2008 | Hanson | |
| 2008/0001039 A1 | 1/2008 | Winter et al. | |
| 2008/0072571 A1 * | 3/2008 | Beardsley | F02K 1/72 60/226.2 |
| 2008/0084130 A1 | 4/2008 | Darby | |
| 2008/0163606 A1 | 7/2008 | Cini et al. | |
| 2009/0013664 A1 * | 1/2009 | Jones et al. | 60/228 |
| 2009/0053058 A1 | 2/2009 | Kohlenberg et al. | |
| 2009/0288386 A1 | 11/2009 | Marshall et al. | |
| 2010/0031630 A1 | 2/2010 | Bulin et al. | |
| 2010/0064659 A1 * | 3/2010 | Wang | 60/226.2 |
| 2010/0139242 A1 * | 6/2010 | Vauchel et al. | 60/226.2 |
| 2010/0192715 A1 | 8/2010 | Vauchel et al. | |
| 2010/0205931 A1 | 8/2010 | Baudu et al. | |
| 2010/0229527 A1 | 9/2010 | Amkraut et al. | |
| 2010/0229528 A1 | 9/2010 | Ramlaoui et al. | |

(56) References Cited

U.S. PATENT DOCUMENTS

| | | | |
|---|---|---|---|
| 2011/0023450 A1* | 2/2011 | Stuart et al. | 60/226.2 |
| 2011/0120078 A1* | 5/2011 | Schwark et al. | 60/226.2 |
| 2011/0167790 A1* | 7/2011 | Cloft et al. | 60/226.2 |
| 2011/0296813 A1* | 12/2011 | Frank et al. | 60/230 |
| 2012/0193441 A1* | 8/2012 | Parham | 239/11 |

FOREIGN PATENT DOCUMENTS

| | | |
|---|---|---|
| CN | 101274664 | 10/2008 |
| EP | 0109219 A2 | 5/1984 |
| EP | 0 315 524 A1 | 10/1989 |
| EP | 0 779 429 A2 | 6/1997 |
| EP | 1004798 | 5/2000 |
| EP | 1 052 427 A2 | 11/2000 |
| EP | 1878904 A2 | 1/2008 |
| EP | 2050948 A2 | 4/2009 |
| EP | 1978231 B1 | 2/2012 |
| FR | 0 315 524 A1 | 5/1989 |
| FR | 2 866 020 A1 | 8/2005 |
| FR | 2917788 A1 | 6/2007 |
| FR | 2921976 A1 | 10/2007 |
| FR | 2922059 A1 | 10/2007 |
| FR | 2912189 A1 | 8/2008 |
| GB | 841110 | 7/1960 |
| GB | 925010 A | 5/1963 |
| GB | 2285020 A | 6/1995 |
| WO | 02/103189 A1 | 12/2002 |
| WO | 03072922 | 9/2003 |
| WO | WO 2005/082771 A1 | 9/2005 |
| WO | 2008045070 A1 | 4/2008 |
| WO | WO 2008/045034 A1 | 4/2008 |
| WO | WO 2008/045056 A1 | 4/2008 |
| WO | WO 2008/045062 A1 | 4/2008 |
| WO | WO 2008/045068 A1 | 4/2008 |
| WO | WO 2008/045081 A1 | 4/2008 |
| WO | WO 2008/0456069 A1 | 4/2008 |
| WO | WO 2008/063152 A2 | 5/2008 |
| WO | WO 2008/063154 A2 | 5/2008 |
| WO | WO 2009/029401 A2 | 3/2009 |

OTHER PUBLICATIONS

English translation of Official Action for Chinese Application No. 200880102315.X, dated Sep. 25, 2012, 32 pgs.
Official Action for Chinese Application No. 201010206330.8, dated Oct. 8, 2012, 6 pgs.
English translation of Official Action for Chinese Application No. 201010206330.8, dated Oct. 8, 2012, 8 pgs.
Official Action for Chinese Application No. 201010156573.5, dated Oct. 10, 2012, 6 pgs.
English translation of Official Action for Chinese Application No. 201010156573.5, dated Oct. 10, 2012, 8 pgs.
Official Action for U.S. Appl. No. 12/419,080, dated Dec. 7, 2012, 8 pgs.
Official Action for Chinese Application No. 201010206302.6, dated Nov. 5, 2012, 12 pgs.
English translation of Official Action for Chinese Application No. 201010206302.6, dated Nov. 5, 2012, 16 pgs.
European Search Report for EP 12002710.7, dated Jan. 8, 2013, 7 pgs.
Official Action (U.S. Appl. No. 12/057,497) dated Sep. 28, 2011, 9 pgs.
Official Action (EP App. No. 08251152.8), dated Jul. 7, 2010, 6 pgs.
EP Exam Report (EP App. No. 08828100.1), dated Dec. 23, 2010, 5 pgs.
EP Search Report (EP App. No. 10002809.1), dated Nov. 21, 2011, 5 pgs.
Official Action for U.S. Appl. No. 12/057,497, dated Feb. 2, 2012, 17 pgs.
Official Action for U.S. Appl. No. 12/485,559, dated Jun. 12, 2012, 15 pgs.
Official Action for U.S. Appl. No. 12/485,551, dated Jun. 27, 2012, 18 pgs.
Office Action dated Nov. 26, 2013 in Chinese Application No. 201010156573.5.
Search Report dated Sep. 18, 2013 in European Application No. 12002710.7.
Search Report dated Mar. 12, 2013 in European Application No. 12197068.5.
Notice of Allowance dated Mar. 15, 2013 in U.S. Appl. No. 12/419,080.
Notice of Allowance dated Dec. 20, 2012 in U.S. Appl. No. 12/485,551.
Notice of Allowance dated Nov. 13, 2012 in U.S. Appl. No. 12/485,559.
Office Action dated Dec. 5, 2013 in Chinese Application No. 201110126044.5.
Office Action dated Jun. 5, 2013 in Chinese Application No. 201010156573.5.
Final Office Action dated Feb. 27, 2014 in U.S. Appl. No. 12/781,242.
Advisory Action dated May 8, 2014 in U.S. Appl. No. 12/781,242.
Office Action dated Oct. 23, 2013 in U.S. Appl. No. 12/781,242.
Office Action dated Mar. 13, 2013 in U.S. Appl. No. 12/781,242.
European Search Report dated Jan. 23, 2012 (EP Application No. 10005249), 5 pgs.
Official Action for U.S. Appl. No. 12/419,080, dated Aug. 1, 2012, 8 pgs.
Restriction Requirement dated Mar. 21, 2016 in U.S. Appl. No. 13/769,599.
Office Action dated May 13, 2016 in U.S. Appl. No. 13/770,455.
Office Action dated Jun. 28, 2016 in U.S. Appl. No. 13/769,599.
Final Office Action dated Dec. 6, 2016 in U.S. Appl. No. 13/769,599.
Notice of Allowance dated Nov. 8, 2016 in U.S. Appl. No. 13/770,455.
Notice of Allowance dated Apr. 4, 2017 in U.S. Appl. No. 13/769,599.
European Search Report (EP 10005250), dated Jan. 25, 2012, 5 pgs.

* cited by examiner

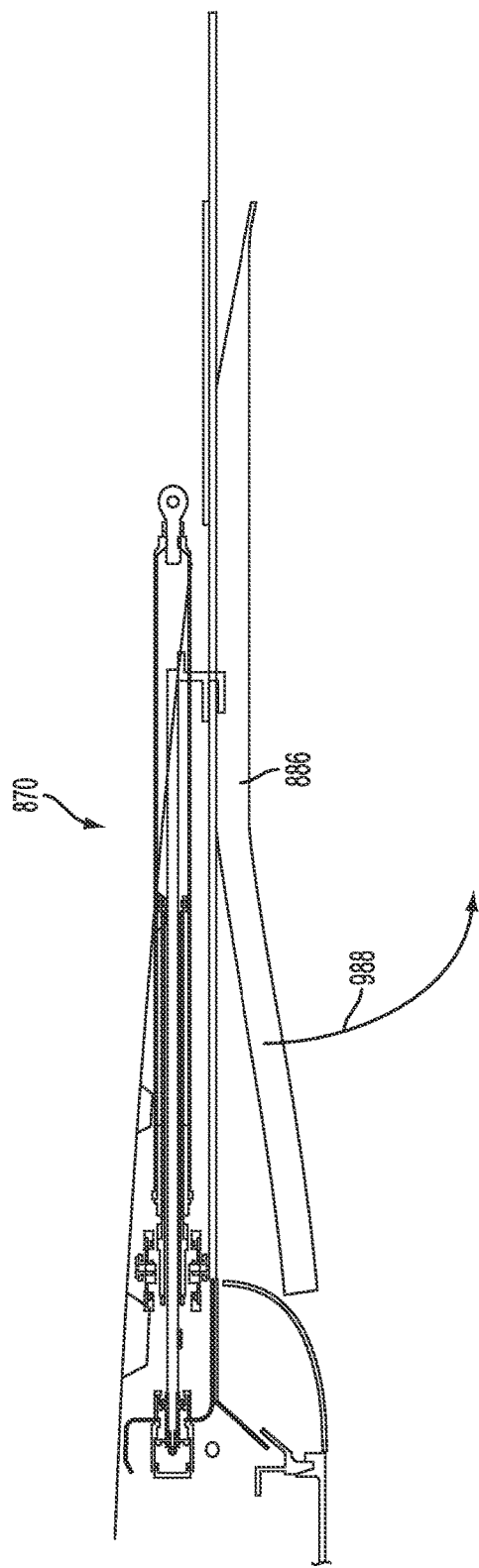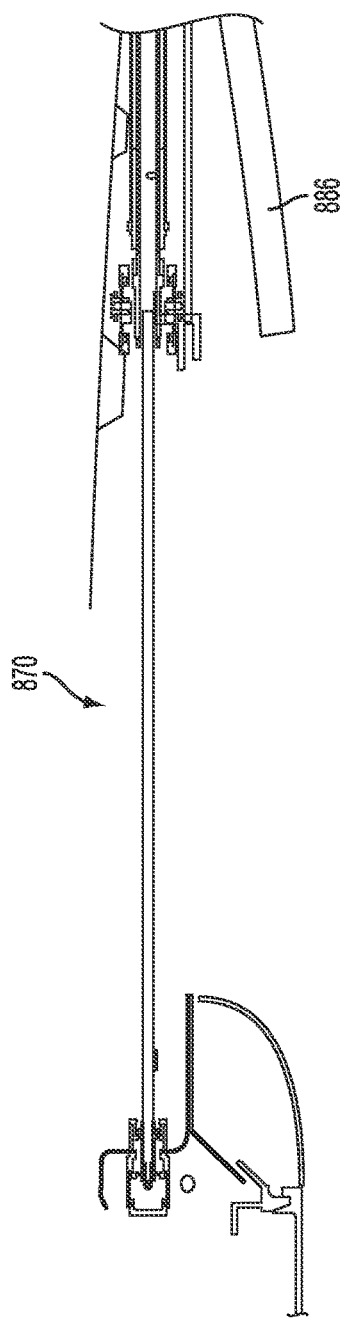

VARIABLE AREA FAN NOZZLE WITH BYPASS FLOW

TECHNICAL FIELD

The present invention generally relates to gas turbine aircraft engines, and in particular, to a translating trailing edge variable area nozzle assembly for a gas turbine aircraft engine for controlling the air flow exhausted from the engine for varying performance output.

BACKGROUND

Typical aircraft turbofan jet engines include a fan that draws and directs a flow of air into and around an engine core and a nacelle. The nacelle surrounds the engine core and helps promote the laminar flow of air past the engine core. The flow of air that is directed into the engine core is initially passed through a compressor that increases the air flow pressure, and then through a combustor where the air is mixed with fuel and ignited. The combustion of the fuel and air mixture causes a series of turbine blades at the rear of the engine core to rotate, and in turn to provide power to the fan. The high-pressure heated exhaust gases from the combustion of the fuel and air mixture are thereafter directed through an exhaust nozzle out of the rear of the engine.

The flow of air that is directed around the engine core is called bypass flow and provides the main thrust for the aircraft. The bypass flow also is used to help slow an aircraft, when the flow is diverted by thrust reversers mounted in the nacelle structure that surrounds the engine core. The bypass flow may or may not be mixed with the engine core exhaust before exiting.

Several turbofan engine parameters are important to those of skill in the art in order to optimize design characteristics and performance. The bypass ratio (BPR) is the ratio of air mass passing through the fan to that going through the core. Higher BPR engines can be more efficient and quieter. In general, a higher BPR results in lower average exhaust velocities and less jet noise at equivalent thrust rating of a lower BPR engine. Also, the exit area and mass flow rates and pressures define the fan pressure ratio (FPR).

Turbofan engine operation parameters and characteristics can further be reflected in a turbofan engine's operating map. Operation maps can be created in various ways, such as on turbine rig test results or predicted by applicable computer programs as is known in the art. Typical turbine operation maps can show relationships between pressure ratios (e.g., FPR) on the y-axis and corrected mass flows on the x-axis. The operation line(s) on the turbofan operation map reflects the line or ranges in which the relationship between FPRs and correct mass flow values result in maximum thrust and minimum fuel consumption. For example, it is known that altering the engine's characteristics that lower the operating line can increase fuel efficiency and reduce noise emissions from the engine since more thrust is produced with less fuel being injected into the combustors, and the stoichiometry of the engine is increased. The resulting reduction of FPRs, however, can reach a practical limit as a low FPR can cause engine fan stall, blade flutter or compressor surge under certain operating conditions, with insufficient bypass flow possibly causing engine malfunction.

A solution to optimizing the operating line at all flight conditions, for those engines that draw significant benefit from such an optimization, includes varying the exit nozzle area during operation. Variable area nozzles for aircraft jet engines are known to help aircraft obtain lower FPR by favorably reconfiguring engine cycle characteristics. Such variable area nozzles generally have included a series of flow deflectors or fins (often called "turkey feathers") that can flair outwardly or pivot inwardly to increase or decrease the size of the nozzle opening and accordingly expand or constrict the flow of the exhaust air upon exit. Unfortunately, the expansion of such turkey feathers may cause undesirable leakage and can adversely interact with the outside air flow passing over the engine, which can create undesirable drag, noise, and a reduction in thrust due to the overboard leakage, leading to greater fuel consumption. In addition, prior variable area nozzle systems typically have been heavy, expensive and somewhat complex in their structure and operation, generally requiring the coordinated movement of multiple components that employ complicated drive mechanisms.

Accordingly, it can be seen that a need exists for a variable area nozzle assembly for an aircraft turbine engine that promotes a cost effective, simple and efficient operation for control of engine output to match desired flight conditions.

SUMMARY

According to one embodiment of the invention, the exit area of a nozzle assembly is varied by translating, or moving fore and aft, a ring assembly located at the rear of the engine nacelle. The ring may be axially translatable, for example, along the axis of the engine. As the ring translates, the trailing edge of the ring defines a variable nozzle exit area. Translation of the ring creates an upstream exit at a leading edge of the ring assembly to bleed or otherwise spill excess flow from the engine bypass duct. As the engine operates in various flight conditions, the ring can be translated to optimize on-demand the engine operating line, resulting in lower fan pressure ratios and thereby increase the efficiency of the engine.

The foregoing and other features, aspects, and advantages of the invention will become more apparent upon review of the detailed description of the preferred embodiments set forth below when taken in conjunction with the accompanying drawing figures, which are briefly described as follows.

DESCRIPTION OF THE DRAWINGS

According to common practice, the various features of the drawings discussed below are not necessarily drawn to scale. Dimensions of various features and elements in the drawings may be expanded or reduced to more clearly illustrate the embodiments of the invention.

FIG. 30 is a section view of the variable area nozzle assembly according to the fifth embodiment.

FIG. 31 is another section view of the variable area nozzle assembly according to the fifth embodiment.

DETAILED DESCRIPTION

FIGS. 1-8 show a variable area nozzle assembly according to a first embodiment of this invention.

Figure 1:
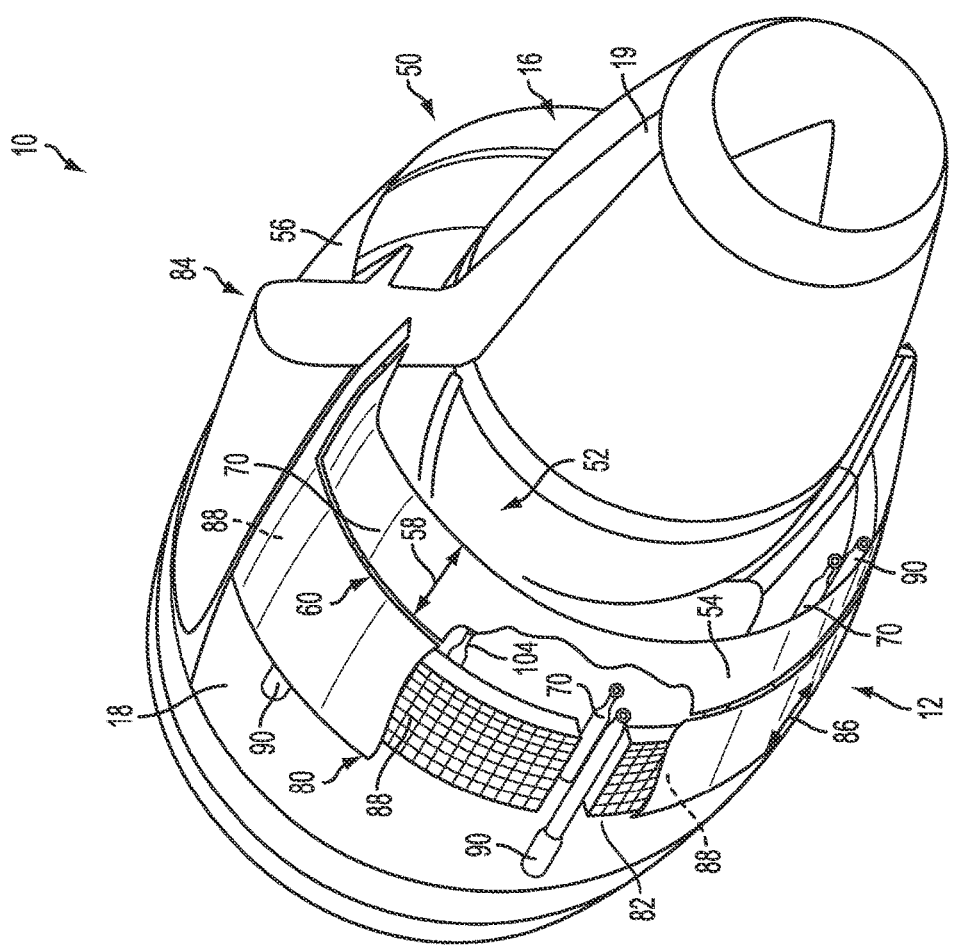
FIG. 1 illustrates an aircraft engine having a trailing edge variable area nozzle assembly according to a first embodiment of the invention.
Figure 2:
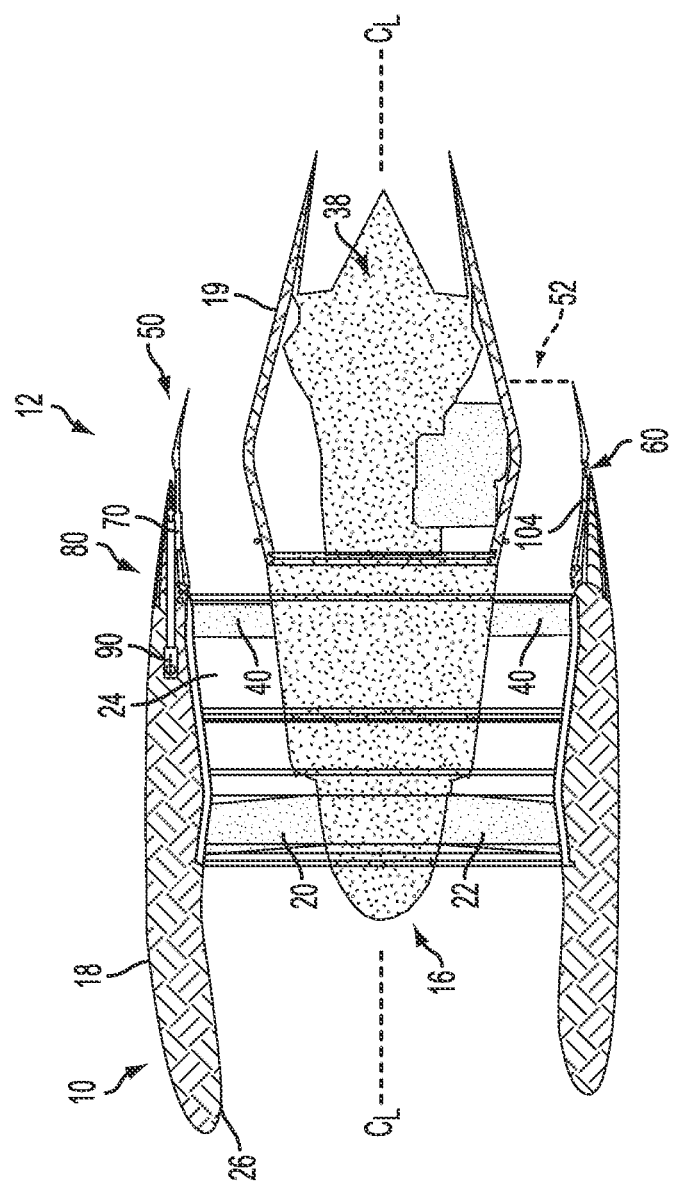
FIG. 2 is a partially schematic section view of the aircraft engine according to the first embodiment.

Referring to FIGS. 1 and 2, the engine 10 includes a trailing edge variable area fan nozzle (VAFN) assembly 12 having a translating ring assembly 50 that may be adjusted, for example, as the engine 10 operates under varying flight conditions. As stated, such an adjustment can cause a shift in the engine's operating line. The translating ring assembly 50 is translated (i.e., moved fore and aft) to vary the nozzle exit area in order to optimize engine operation and to adjust an amount of engine bypass flow spilled through an upstream exit in the nozzle assembly 12. By bleeding or spilling off excess fan flow through the upstream exit of the nozzle assembly 12, lower fan pressure ratios for the same amount of delivered mass flow can be obtained, thereby increasing stall margins and avoiding engine malfunction and shutdown. For the purposes of illustration, the exemplary variable area fan nozzle assembly 12 of the present invention is shown in the context of a gas turbine jet aircraft engine. The engine 10 may be mounted to a wing or fuselage of an aircraft, for example, by a pylon or other, similar support (not illustrated).

The engine 10 includes an engine core 16 and a nacelle 18. The engine core 16 is housed in a core cowl 19. As shown in FIG. 2, a fan 20 is mounted adjacent to an upstream end of the nacelle 18, and includes a series of fan blades 22 that are rotated about the engine centerline $C_L$ during engine operation so as to draw a flow of air into an inlet end 26 of the engine 10. An annular bypass duct 24 is defined between the engine core 16 and the nacelle 18. The air flow drawn into the engine 10 is accelerated by the rotating fan blades 22. A portion of the air flow is directed into and through a compressor (not illustrated) within the engine core 16. The air flow through the engine core 16 is initially passed through the compressor to increase the air flow pressure, after which the pressurized air is passed through a combustor (not shown), where it is mixed with fuel and ignited. The combustion of the fuel and air mixture within the combustor causes the air to expand which in turn drives a series of turbines at the rear of the engine, indicated generally at 38, to rotate and in turn to provide power to the fan 20.

The bypass flow accelerated by the rotating fan blades 22 passes through the bypass duct 24, past stators 40, and out through the nozzle assembly 12. The bypass flow provides the main engine thrust. The high pressure heated exhaust gases from the combustion of the fuel and air mixture are directed through the nozzle assembly 12 out of the rear of the engine core 16.

Figure 3:
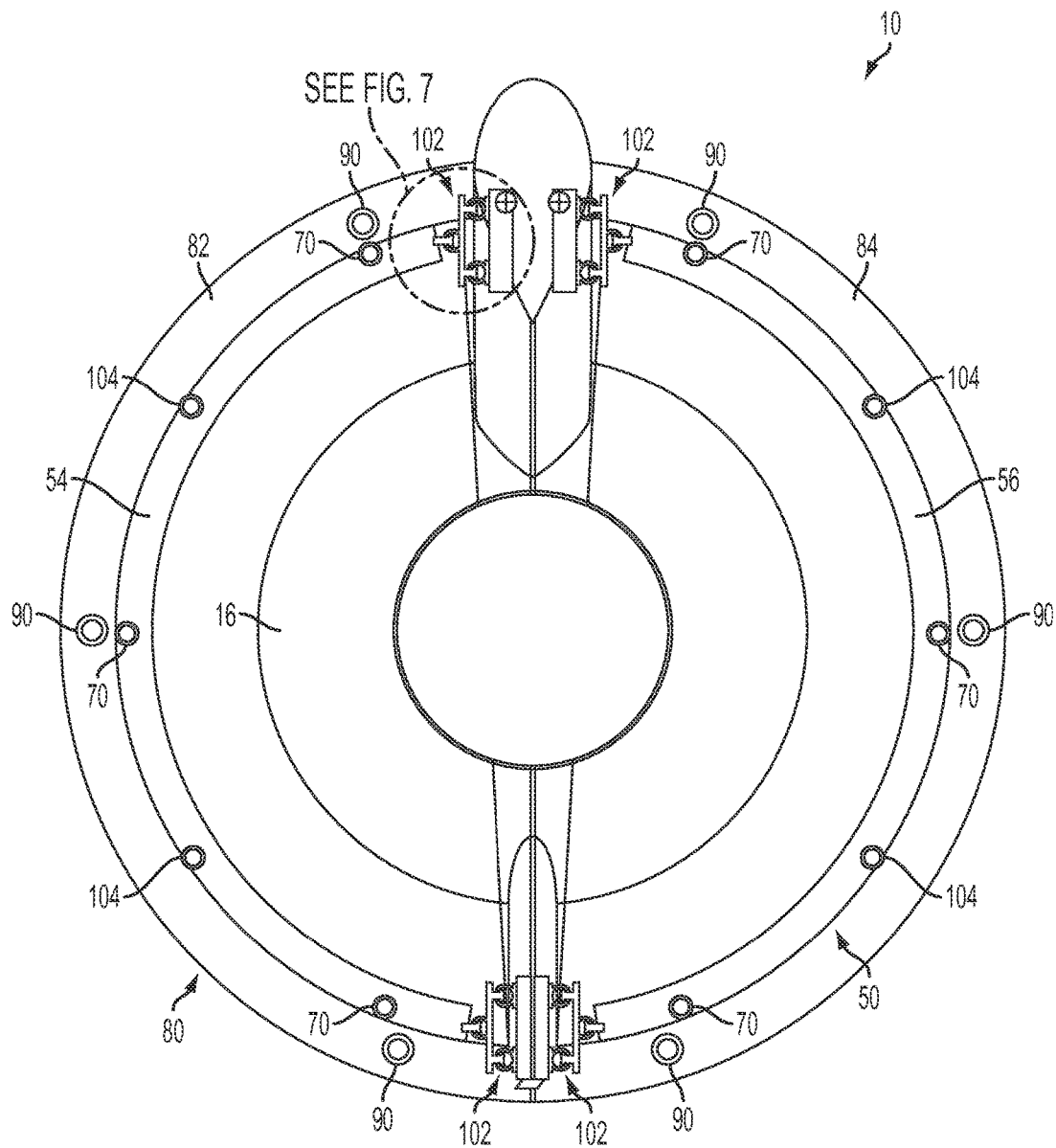
FIG. 3 is an end view of the nozzle end of the engine according to the first embodiment.

The translating ring assembly 50 can be a ring-like annular airfoil structure mounted at the trailing end of a thrust reverser 80, adjacent to and circumscribing the engine core cowl 19. The area between the trailing edge of the ring assembly 50 and the core cowl 19 defines the nozzle exit area 52 for the nozzle assembly 12. As shown in FIGS. 1 and 3, the ring assembly 50 can comprise an arcuate first ring section 54 and an arcuate second ring section 56, each ring section 54, 56 being axially translatable in the direction of the bidirectional arrow 58. Translation of the ring assembly 50 effects a desired size of an upstream exit 60 and varies the outlet geometric and exit area 52 of the nozzle 12 outlet for the engine bypass flow. The ring assembly 50 can be translated, for example, by a plurality of ring actuators 70.

The thrust reverser 80 may be adjacent to and forward of the translating ring assembly 50 to block and redirect the bypass flow in the bypass duct 24 into a thrust reversing vector. In FIG. 1, the thrust reverser 80 and the translating ring assembly 50 are in stowed or closed positions. The thrust reverser 80 can comprise an arcuate first sleeve or cowl section 82 and an opposed arcuate second sleeve or cowl section 84 (shown in FIG. 3). The thrust reverser sleeve sections 82, 84 can be axially translatable in the direction of the bidirectional arrow 86 by a plurality of sleeve actuators 90. The thrust reverser sleeve sections 82, 84 are translatable over a series of cascade vanes 88. The cascade vanes 88 are indicated by dashed lead lines in FIG. 1 because they are not visible when the thrust reverser 80 is in the stowed position. Axial translation of the sleeve sections 82, 84 in the fore and aft directions allows the bypass air flow to be passed through the cascade vanes 88 to generate a thrust-reversing vector.

FIG. 3 is a partial section view of the aft end of the engine 10, and illustrates the arrangement of the ring and sleeve actuators 70, 90, respectively, around the periphery of the engine 10. As shown in FIG. 1, and more clearly in FIG. 3, the sleeve half section 82 and the ring half-section 54 cooperate to generally define an approximately 180 degree sector of the combined thrust reverser and translating ring structure. Likewise, sleeve half section 84 and ring half section 56 cooperate to generally define an opposed approximately 180 degree sector of the thrust reverser and translating ring structure. Together, these approximate 180 degree sectors cooperate to define the entire approximate 360 degree thrust reverser-translating ring structure.

Figure 7:
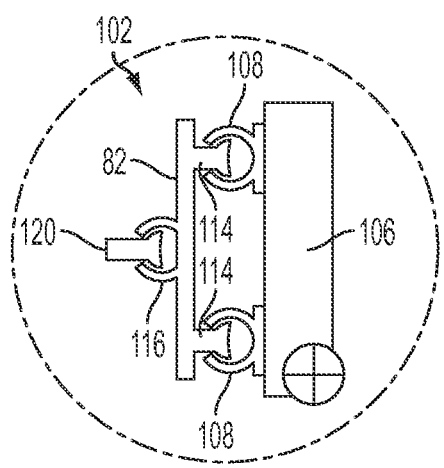
FIG. 7 is a partially schematic isolated view of a guide structure of the variable area nozzle assembly according to the first embodiment.

In the embodiment shown in FIGS. 1-3, each thrust reverser sleeve half-section 82, 84 of the thrust reverser 80 can be translatable by one or more (three are shown) peripherally spaced sleeve actuators 90 fixedly mounted in the nacelle 18. In the embodiment shown, three actuators 90 are used for each sleeve half-section 82, 84. Each half-section 54, 56 of the translating ring assembly 50 similarly can be translated by one or more (three are shown) peripherally spaced ring actuators 70. Ring actuators 70 can be mounted on an adjacent thrust reverser sleeve section 82, 84, respectively. The ring actuators 70 could be powered by, for example, electricity, mechanical, pneumatics, hydraulics, or other means, with appropriate power cables and conduits (not shown) passing via pre-defined passages between or above the thrust reverser cascade boxes or pivot doors. The number and arrangement of ring and sleeve actuators 70, 90 may be varied, for example, according to the thrust reverser and ring assembly configuration, and according to other factors. The ring sections 54, 56 may be mounted in, for example, upper and lower guide structures 102 located at each end of corresponding sleeve sections 82, 84, respectively. FIG. 7 is an isolated view of a guide structure 102. Guide tubes 104 may be mounted in the nacelle 18 and may extend into the ring sections 54, 56 to stabilize the sections 54, 56 against undesirable translation and/or vibration. Guide tubes may alternatively be mounted in the thrust reverser 80.

The translating ring assembly 50 may be a continuous (e.g., one-piece) or, as shown in FIG. 3, a continuing (e.g., split or multi-section) generally annular ring having an airfoil cross section. The upstream exit 60 (formed when the ring assembly 50 moves in the aft direction away from the sleeve sections 82, 84) therefore can have the form of a generally annular gap extending around the perimeter of the rear of the nacelle 18. Other outlet shapes can also be used, e.g., oval, etc. The generally annular gap between the ring sections 54, 56 and the sleeve sections 82, 84 can be continuous, for example, or interrupted at one or more locations, such as, for example, at points of bifurcation or other separation of the ring assembly 50. The bypass duct 24 may also be interrupted at one or more locations.

The translating ring assembly 50 and surrounding structure are described below with reference to FIGS. 4-7. In FIGS. 4-7, elements that are obscured or partially obscured due to intervening elements are indicated by dashed lead lines.

Figure 4:
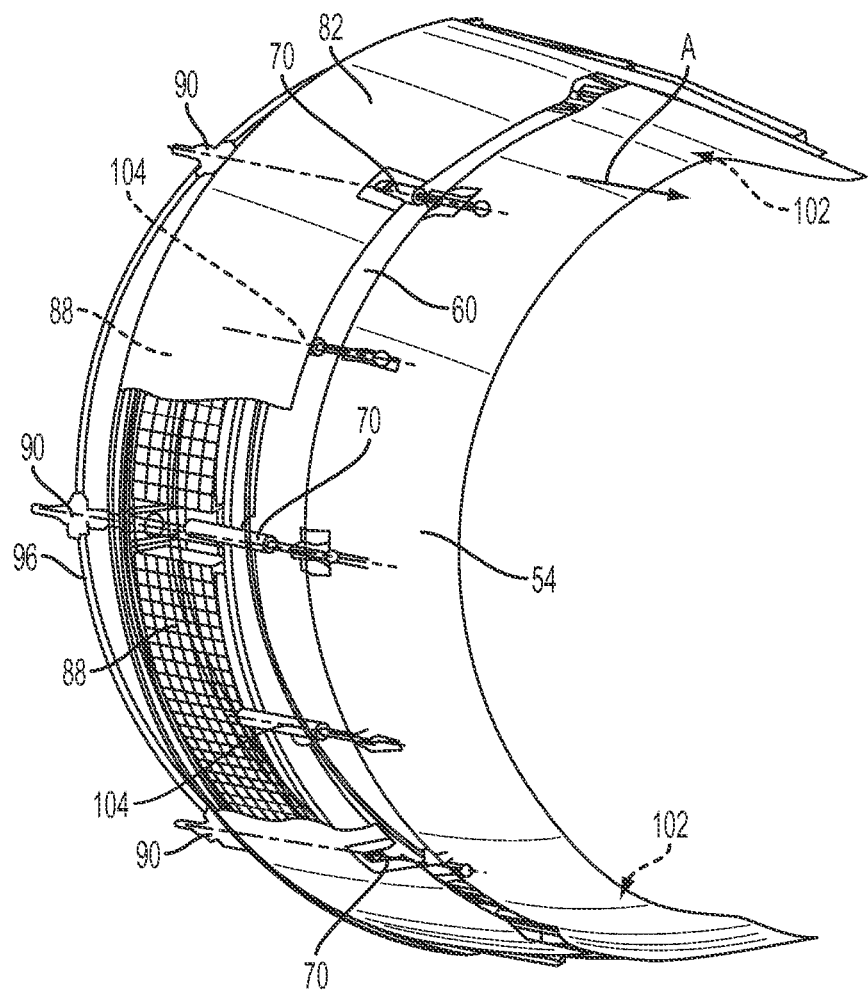
FIG. 4 is a partially schematic section view of the variable area nozzle assembly portion according to the first embodiment.

FIG. 4 is a partial view of the mounting structure for a first ring section 54 of the translating ring assembly 50 and the corresponding, adjacent first sleeve section 82 of the thrust reverser 80. The second ring section 56 of the translating ring assembly 50 and the second sleeve section 84 of the thrust reverser 80, which are shown in FIGS. 1 and 3, can be mounted in a similar manner. In FIG. 4, the thrust reverser 80 is in a stowed position, covering the cascade vanes 88. The translating ring assembly 50 is in an open or deployed position so that an upstream exit 60 is defined between the first ring section 54 and the first sleeve section 84. The rearward axial translation of the first ring section 54 to the deployed position is indicated by the arrow A. The ring actuators 70 can extend from the sleeve section 82, across the upstream exit 60, and connect to a fore end of the ring section 54. The guide tubes 104 can also extend from the sleeve section 82, across the upstream exit 60, and connect to the fore end of the ring section 54. A sleeve actuation cable 96 can connect to each sleeve actuator 90 for power and to provide simultaneous actuation of each actuator 90.

Figure 5:
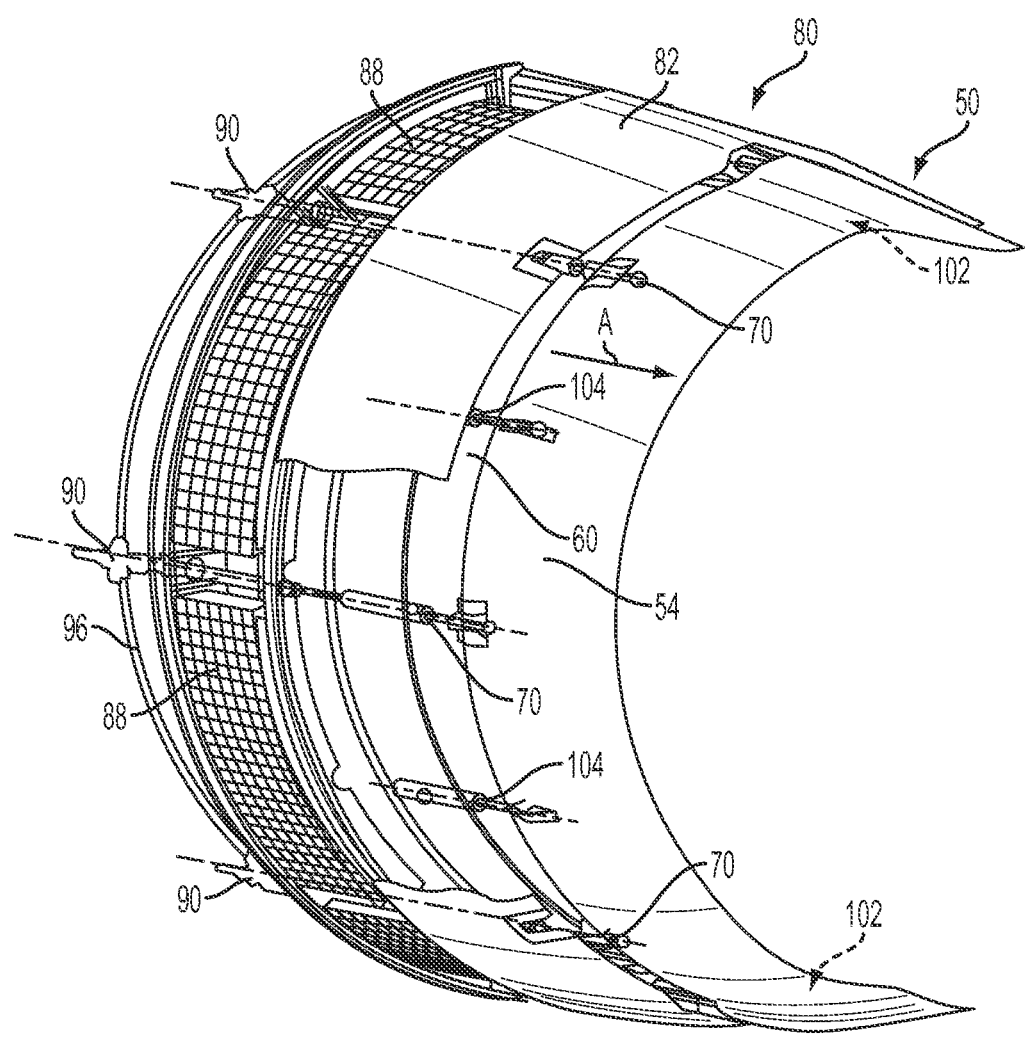
FIG. 5 is another partially schematic section view of the variable area nozzle assembly according to the first embodiment.

FIG. 5 shows the thrust reverser 80 in a deployed position and the translating ring assembly 50 in the open position. The rearward axial translation of the first sleeve section 82 from the position shown in FIG. 4 to the deployed position is indicated by the arrow B. Rearward translation of the sleeve section 82 exposes the cascade vanes 88 during operation of the thrust reverser 80. The ring section 54 can also be translated rearwardly during operation of the thrust reverser 80, as shown in this embodiment. Translation of the ring section 54 at the same time that the thrust reverser 80 is deployed, may be optional because the bypass flow is rerouted through the cascade vanes 88.

Figure 6:
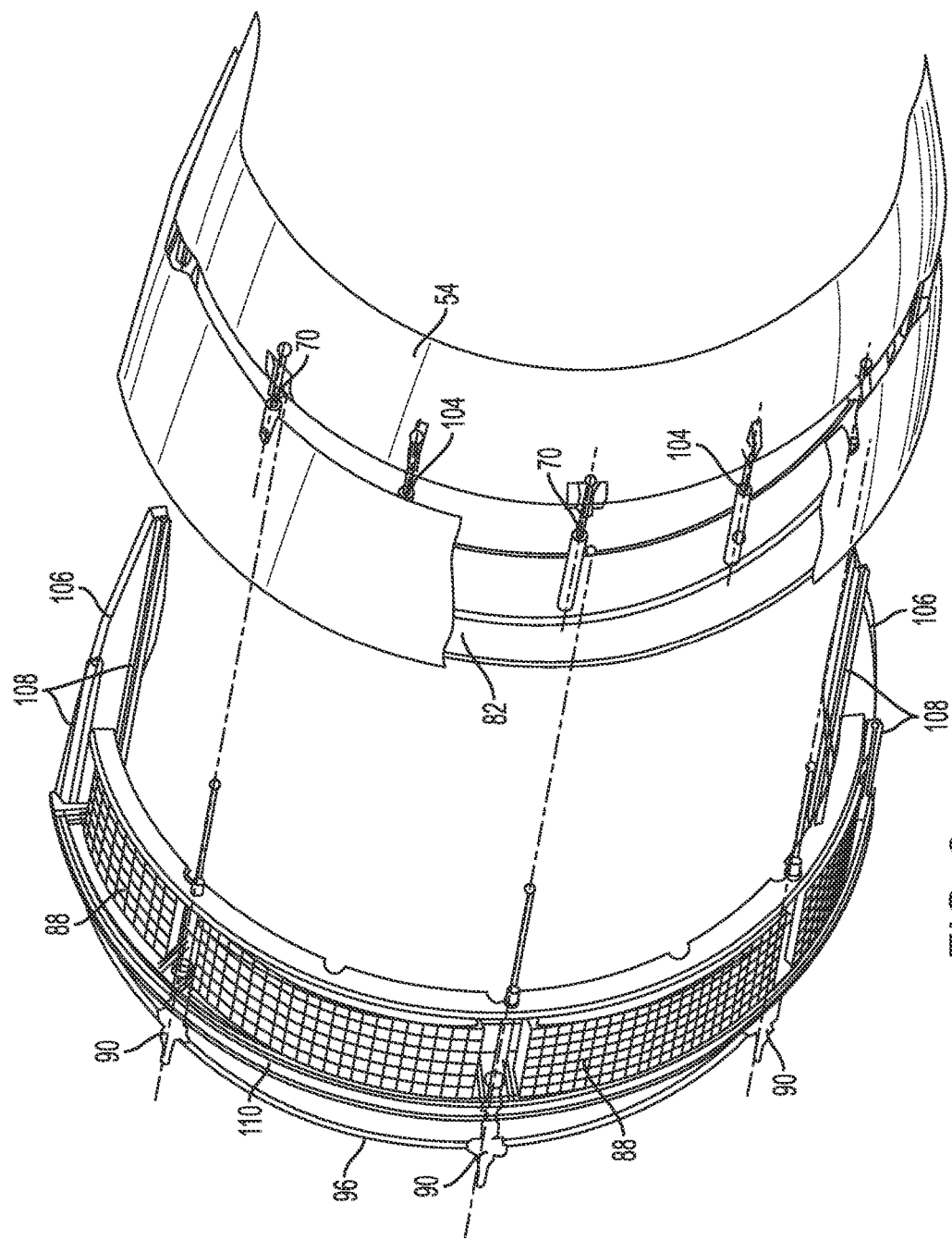
FIG. 6 is a partially schematic, exploded section view of the variable area nozzle assembly according to the first embodiment.

FIG. 6 is a partial, exploded view with the first sleeve section 82 and its corresponding first ring section 54, illustrated separate from the surrounding mounting structure.

FIG. 7 is a partial section isolated view taken through one of the guide structures 102. Referring generally to FIGS. 3 and 6 and particularly to FIG. 7, in the guide structure 102, a beam 106 can be fixedly attached to a transverse bulkhead 110 that extends 180 degrees and can include axially (e.g., parallel to the centerline of the engine 10) extending guide tracks 108 attached thereto. The bulkhead 110 may be integral with or otherwise fixedly mounted to the engine nacelle 18 (FIG. 1). The thrust reverser sleeve section 82 can be connected to axially extending track bars 114 (FIG. 7) that are slidably received within the guide tracks 108 of the fixed beam 106. The thrust reverser sleeve section 82 is thereby slidably mounted with respect to the nacelle 18. The thrust reverser sleeve section 82 can also include an axially extending track guide 116 in which a translating ring track bar 120 is slidably received. The translating ring track bar 120 can be connected to the first ring section 54, and the ring section 54 axially translates as the track bar 120 slides within the track guide 116. The ring section 54 is thereby slidably mounted with respect to the sleeve section 82 of the thrust reverser 80. The translating sleeve section 82 and the track bar 120 can be powered through conventional means, such as mechanical, electric, hydraulic or pneumatic or other equivalent means.

Figure 8:
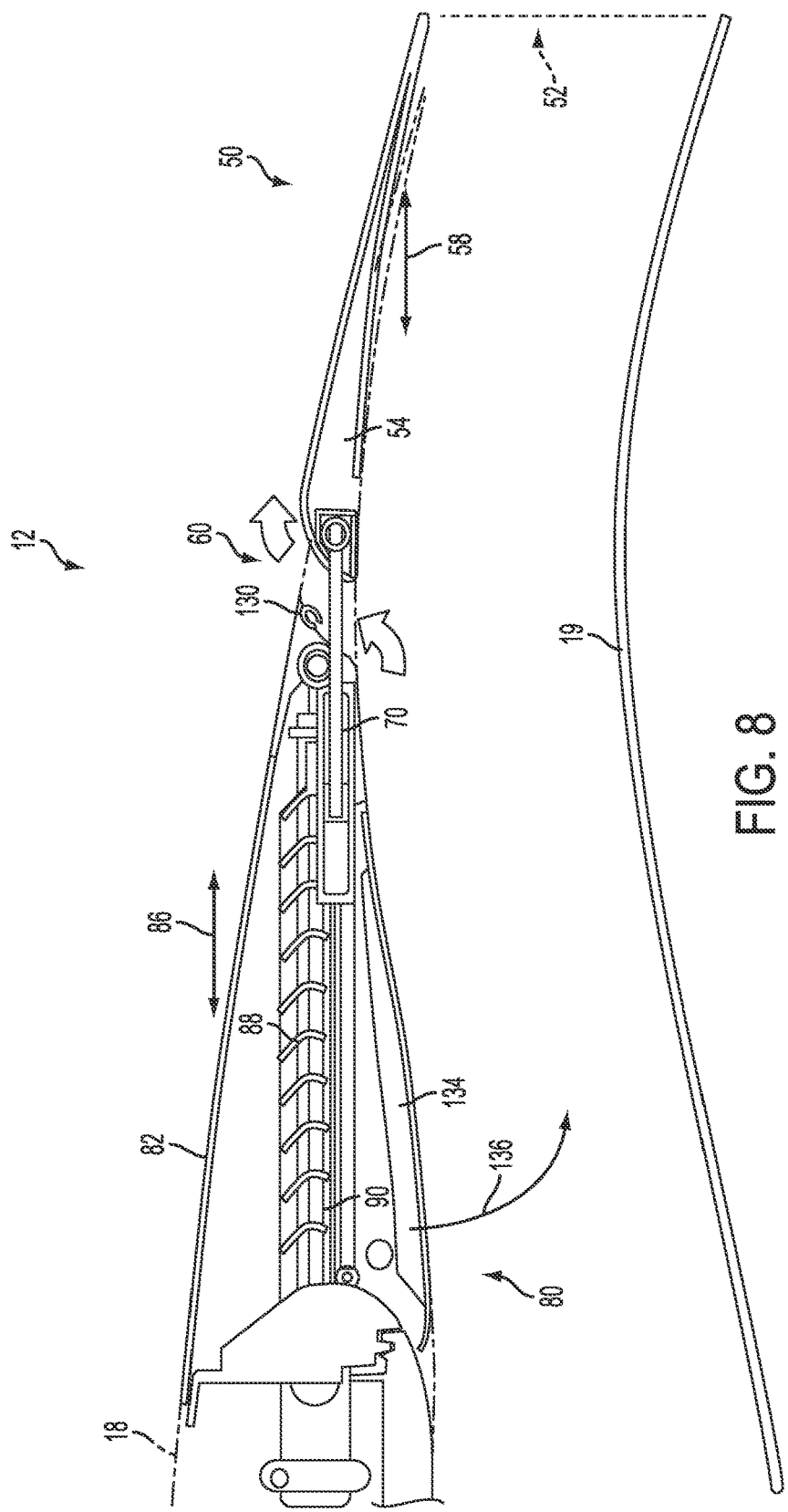
FIG. 8 is a partially schematic section view of the variable area nozzle assembly according to the first embodiment.

FIG. 8 illustrates one method of operating the ring section 54 to achieve flow diversion in accordance with this invention. For example, the size of the upstream exit 60 and the nozzle exit area 52 can be varied in order to achieve differing engine operating parameters. In this capacity, the upstream exit 60 essentially acts as a "bleed" exit that spills airflow traveling through the bypass duct 24. FIG. 8 shows a partial section of a downstream portion of the nozzle assembly 12 illustrating a portion of the bypass air flow, indicated by the curved arrows, being bled through the annular upstream exit 60 in one mode of operation of the nozzle assembly 12. In FIG. 8, the first ring section 54 of the ring 50 and the first sleeve section 82 of the thrust reverser 80 are shown in section, along with associated ring and sleeve actuators 70, 90, respectively, used for axial translation of the sections 54, 82. The second ring section 56 may be similarly constructed and arranged with respect to the second sleeve section 84. The thrust reverser 80 can include blocker doors 134 that are operatively coupled to the first sleeve section 82 and are pivotable in the direction of the curved arrow 136 thereby to block and redirect the bypass flow into a thrust reversing vector.

Still referring to FIG. 8, a high pressure seal 130 may be disposed between the sections 82, 54, at the trailing edge of the translating sleeve section 82. In certain modes of operation, when the sections 82, 54 are drawn together, the seal 130 can operate to substantially seal any gap between the sections 82, 54 and thereby close the upstream exit 60.

As previously discussed, the ring and sleeve actuators 90, 70 can be, for example, mechanical, hydraulic, pneumatic or electric actuators. In the illustrated embodiment, the ring actuator 70 is a constant opening air spring damper with hydraulic closing override, and the sleeve actuator 90 is an electric actuator.

FIGS. 9A-12 illustrate a variable area nozzle assembly 212 according to a second embodiment of the invention. The nozzle assembly 212 may be mounted to a nacelle as generally illustrated in FIG. 1, however with no intervening thrust reverser. Therefore, elements within the embodiment shown in FIG. 9A-12 that are analogous to elements in FIGS. 1-8 use a similar reference numbering system, but are preceded by a "2" or "3."

Figure 9B:
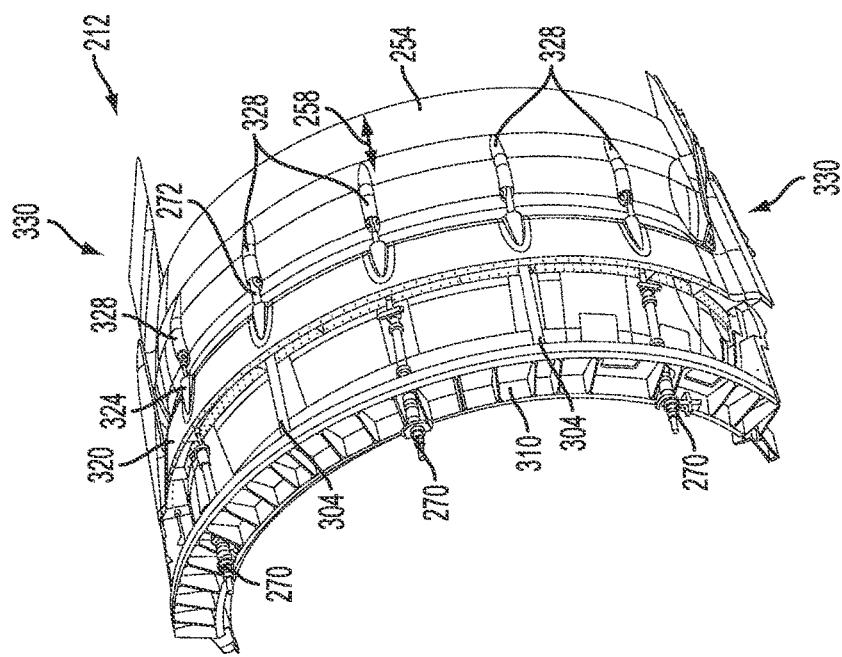
FIG. 9B is another partial exploded view of the variable area nozzle assembly according to the second embodiment.
Figure 9A:
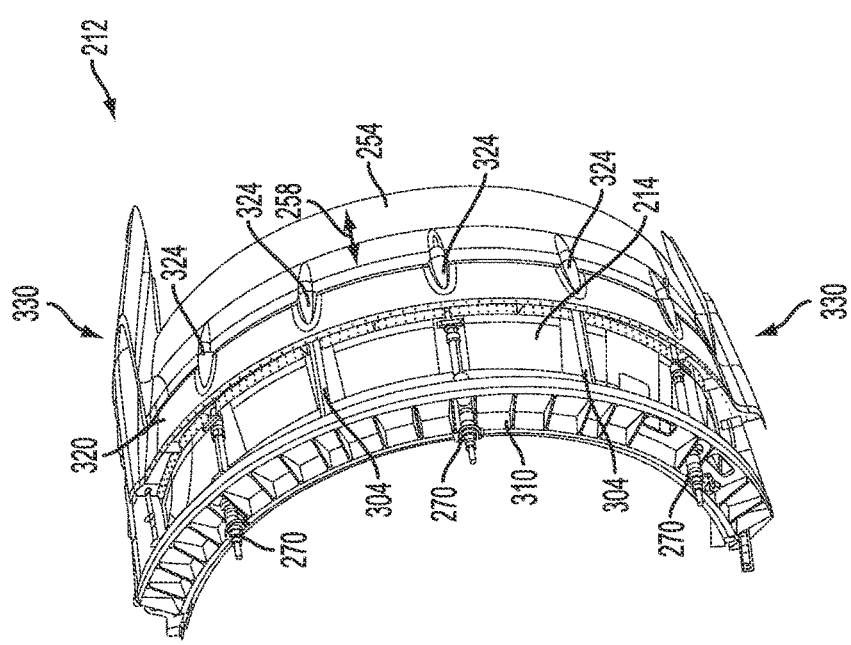
FIG. 9A is a partial exploded view of a variable area nozzle assembly according to a second embodiment of the invention.

FIGS. 9A and 9B are partial cutaway illustrations of the variable area nozzle assembly 212 according to the second embodiment of the invention. In the cutaway illustrations, an outer duct structural liner 214 of the nacelle is visible. The nozzle assembly 212 includes a translating ring assembly (removed for ease of illustration and not shown in FIGS. 9A and 9B) comprised of two ring sections, of which one ring section 254 is illustrated in FIGS. 9A and 9B. In FIG. 9A, the ring section 254 is in the closed (i.e., axially fore) position, and FIG. 9B illustrates the ring section 254 in the open or deployed (i.e., axially aft) position.

The ring section 254 can be mounted at the aft end of an engine. Peripherally spaced translating ring actuators 270 may be mounted to a bulkhead 310 that is fixedly mounted to the nacelle. Guide tubes 304 may also be fixedly mounted to the bulkhead 310 at one end, and received in the ring section 254 at their opposite ends. The translating ring actuators 270 can act in unison to translate the ring section 254 in the direction of the bidirectional arrow 258. Referring to FIG. 9B, actuator shafts 272 of the ring actuators 270 can pass through a blister fairing 320 located fore of the ring section 254. Upstream fairings 324 may be provided at the points where the actuator shafts 272 pass through the blister fairing 320 in order to reduce drag induced by the actuators 270. Similarly, downstream fairings 328 may be provided at the points where the actuator shafts 272 are received in the ring section 254.

Figure 10:
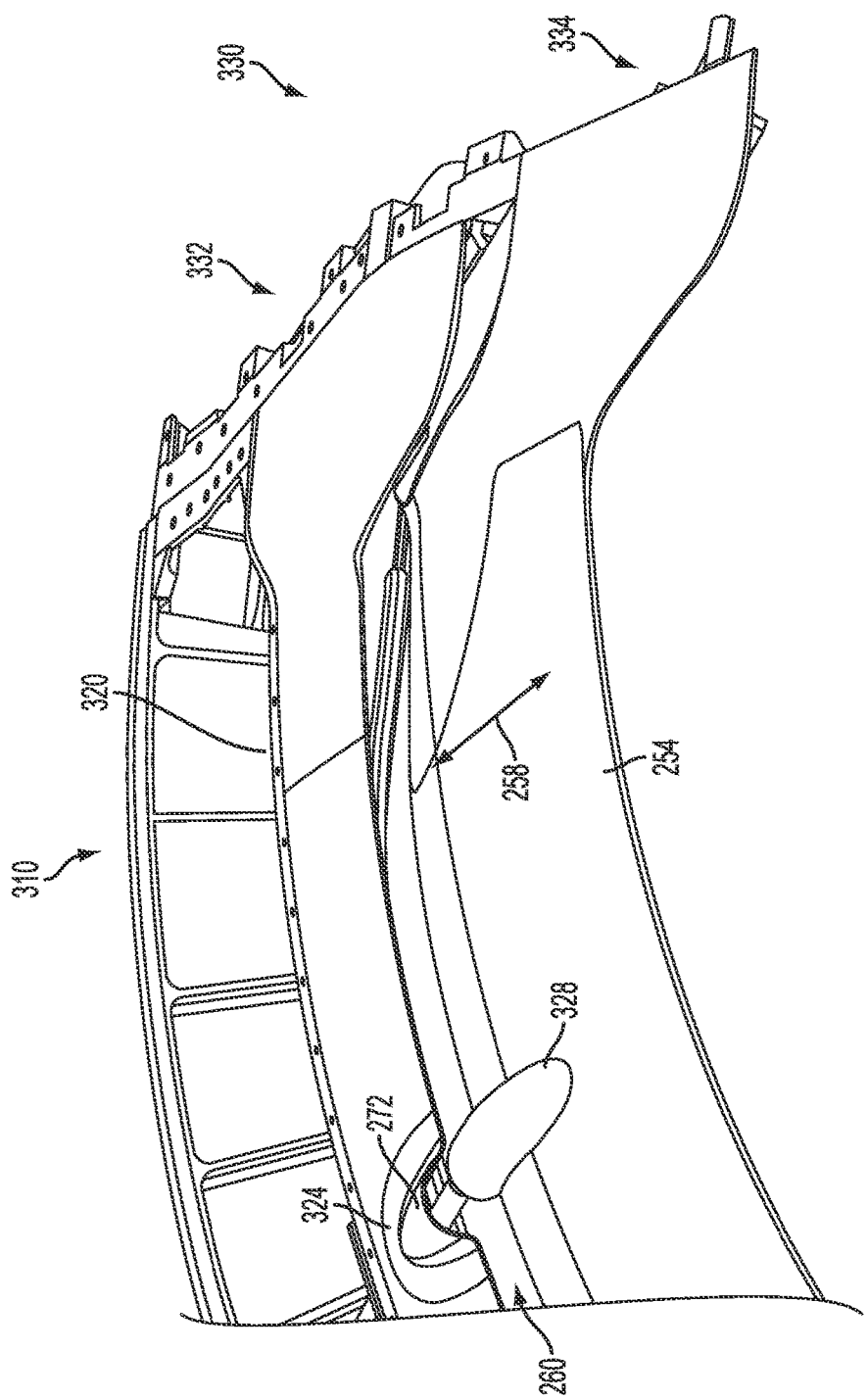
FIG. 10 is another partial exploded view of the variable area nozzle assembly according to the second embodiment.
Figure 11:
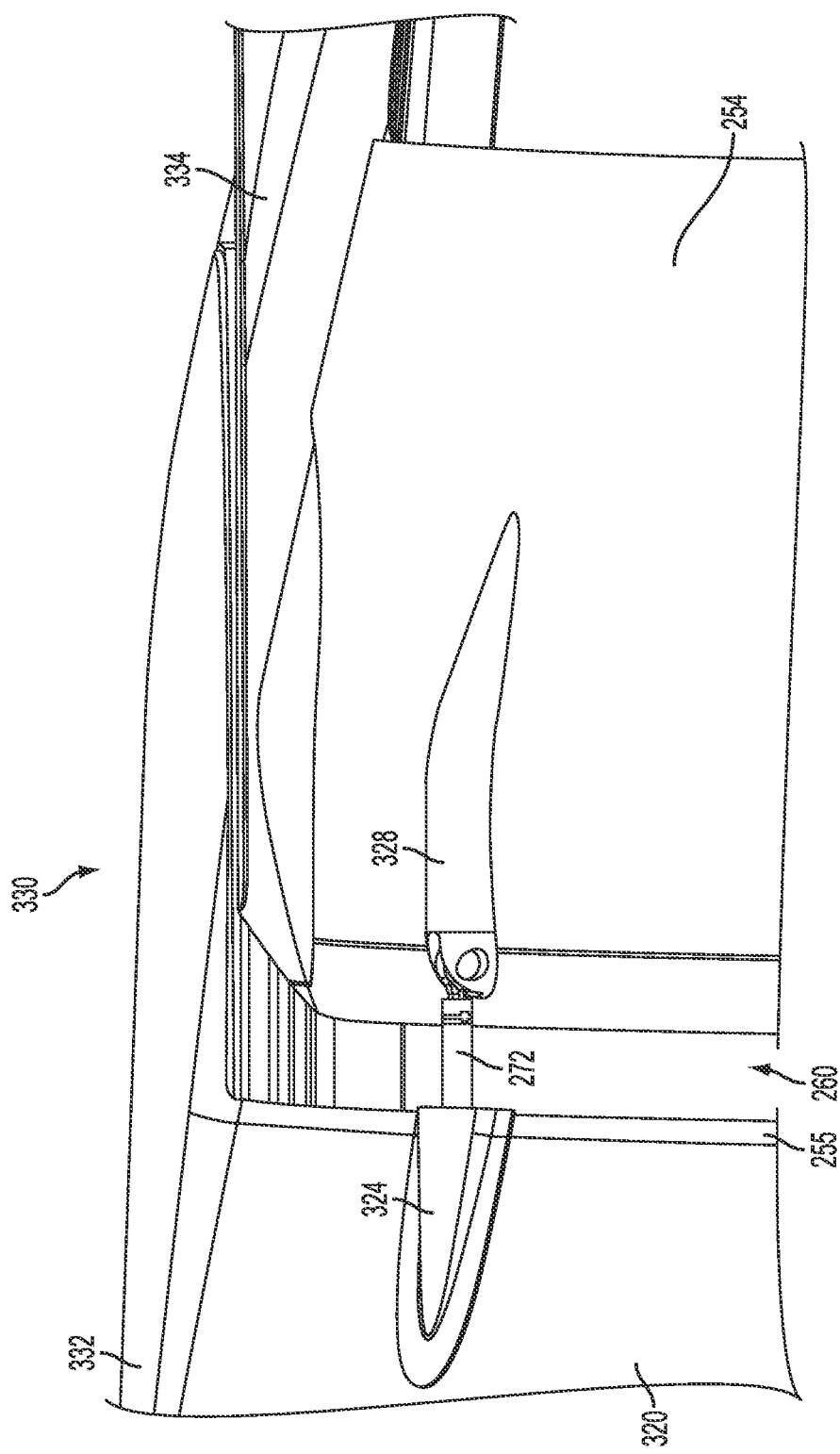
FIG. 11 is another partial exploded view of the variable area nozzle assembly according to the second embodiment.
Figure 12:
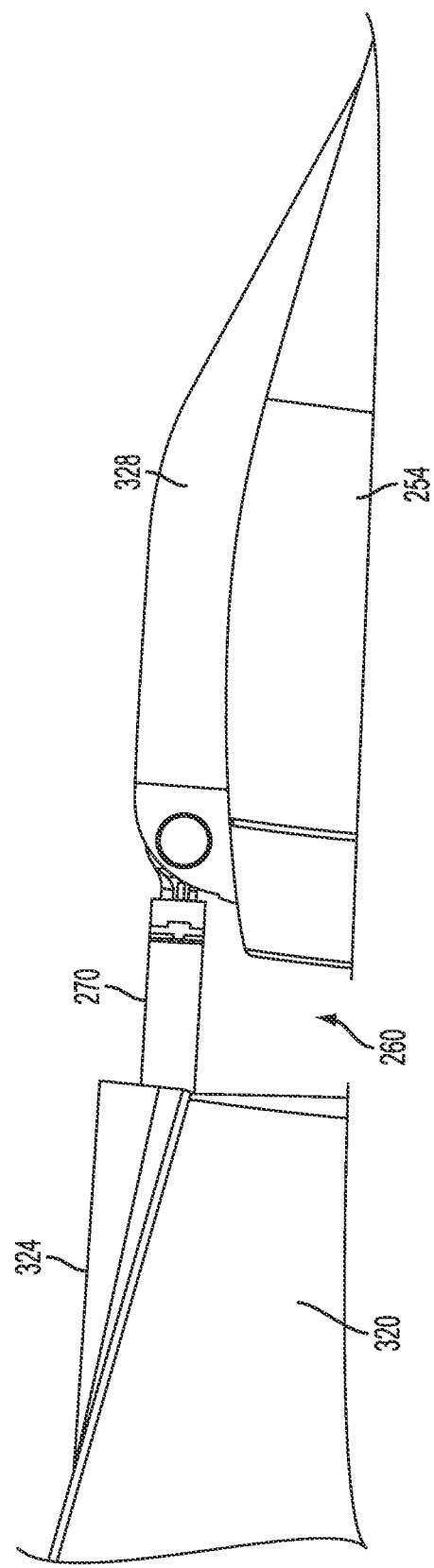
FIG. 12 is another partial exploded view of the variable area nozzle assembly according to the second embodiment.

The ends of the ring section 254 can terminate at beaver tail split fairings 330. As shown in FIGS. 10 and 11, each end of the blister fairing 320 can include an upstream portion 332 of a beaver tail split fairing 330, and a downstream portion 334 of the fairing 330 can be connected to and translatable with the translating ring section 254. Translation of the translating ring section 254 in the direction of the bidirectional arrow 258 can create an upstream exit 260 between the translating ring section 254 and the blister fairing 320. The aft edge of the blister fairing 320 can include a bullnose section 255 (FIG. 11) to also aid in improving air flow out of upstream exit 260 and minimize flow disruption caused by linkages supporting the actuator shafts 272. FIG. 12 is a partial, isolated view of the upstream and downstream fairings 324, 328 of the beaver tail split fairing 330.

The fairings 320, 324, 328, 330 of the aforesaid described embodiment can by selectively used in conjunction with other embodiments described herein. By way of non-limiting example, fairings analogous to fairings 324, 328 could be used in conjunction with the translating sleeve actuators 90, spaced ring actuators 70, or other actuators disclosed herein.

Figure 13:
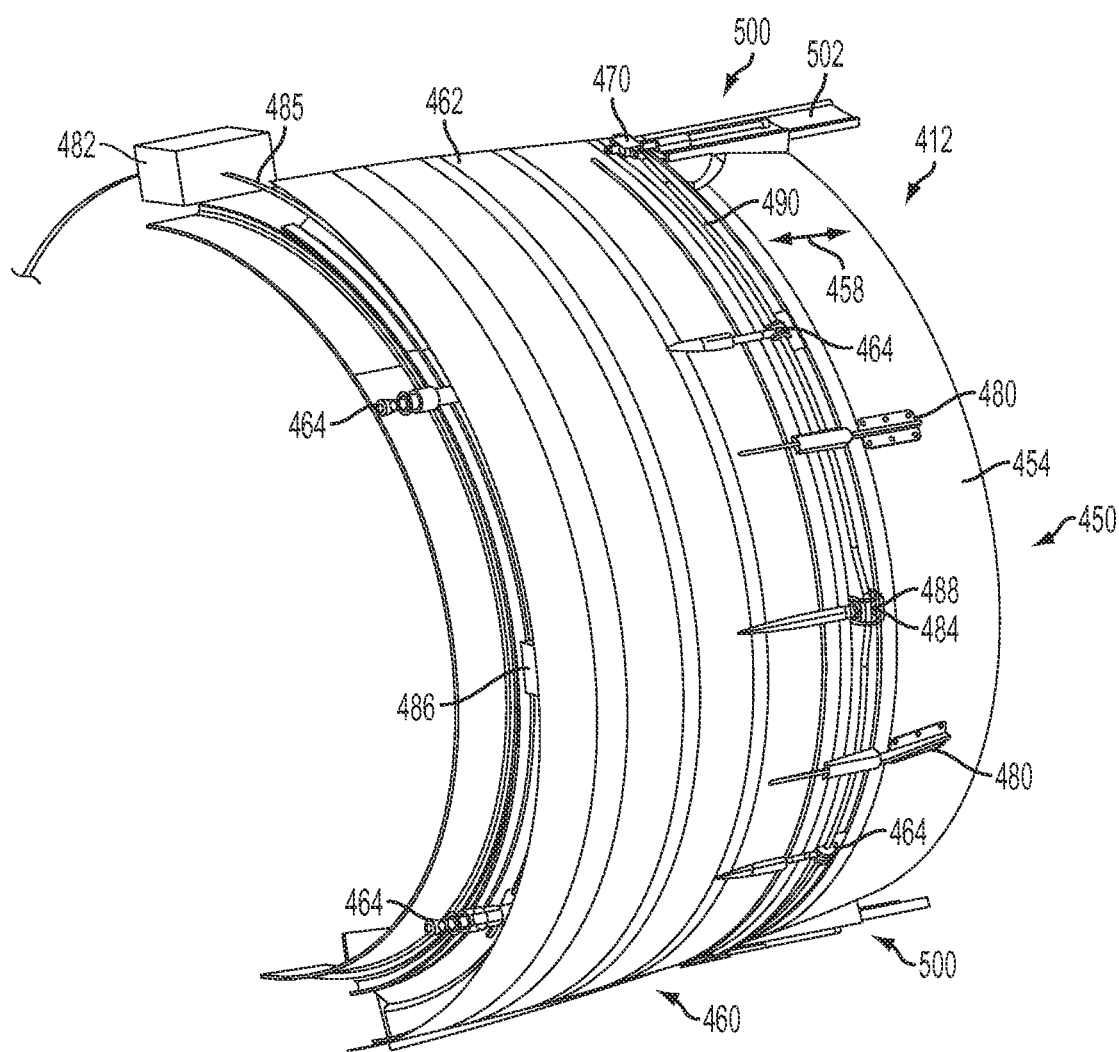
FIG. 13 is a partial exploded view of a variable area nozzle assembly according to a third embodiment of the invention.
Figure 14:
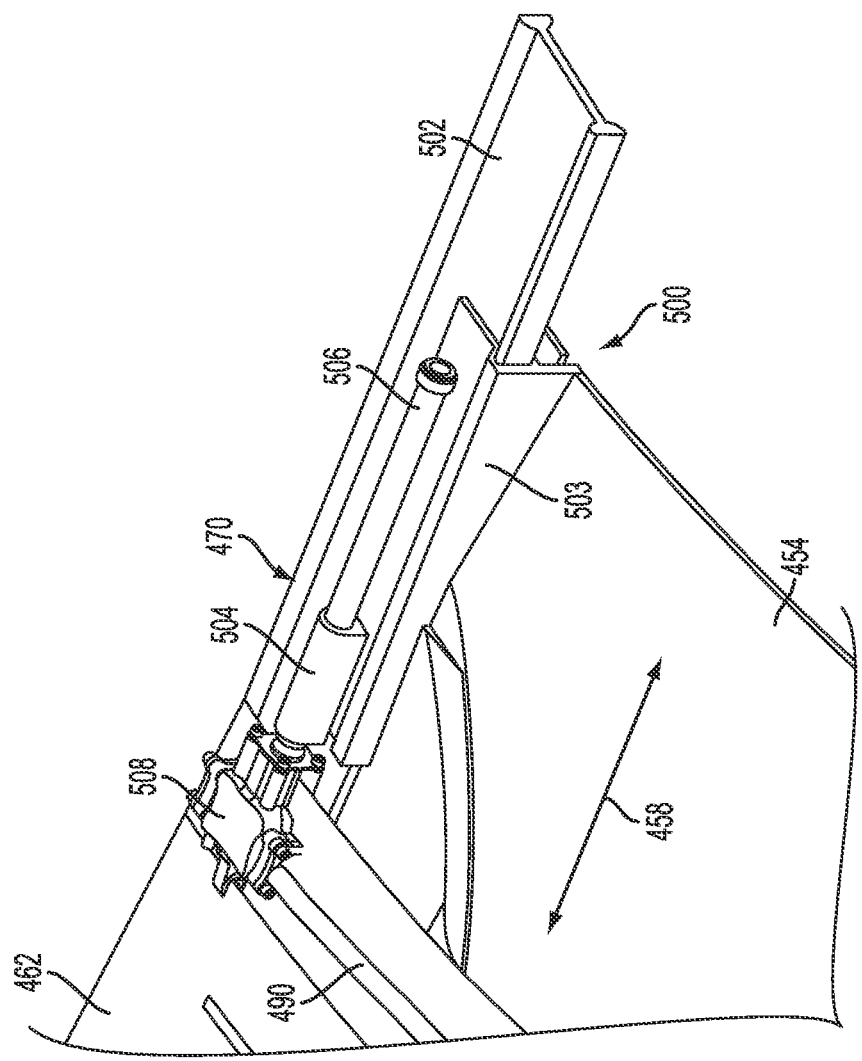
FIG. 14 is an isolated view of a guide structure of the variable area nozzle assembly according to the third embodiment.

FIGS. 13-20 illustrate a variable area nozzle assembly 412 according to a third embodiment of the invention. The nozzle assembly 412 includes a translating ring assembly 450 and may be mounted to a nacelle 18 as generally illustrated in FIG. 1. Referring to FIGS. 13 and 14, the translating ring assembly 450 according to the third embodiment can be comprised of two ring sections, of which a first ring section 454 is illustrated in FIG. 13. The second ring section 456, illustrated schematically in FIG. 15, may be a mirror image of the ring section 454.

In FIG. 13, the translating ring section 454 is in the closed or non-deployed position, with no upstream exit defined between the ring section 454 and the thrust reverser sleeve section 482. The translating ring assembly 450 is mounted aft of a thrust reverser 460 comprising two translating sleeve sections, of which a first sleeve section 462 is illustrated in FIG. 13. The first sleeve section 462 of the thrust reverser 460 can be translated by one or more actuators 464. The ring section 454 can be operated by an actuation system including ring actuators 470 located at each end of the first translating ring section 454. Stabilizer assemblies 480 connecting the first ring section 454 to the first sleeve section 462 can be spaced along the periphery of the nozzle assembly 412 to reduce undesirable translation and/or vibration (e.g., flutter) of the ring section 454. Analogous stabilizer assemblies can be added to other embodiments shown herein where additional stabilization is desired.

Still referring to FIG. 13, a motor or drive mechanism 482 governs the motion of the ring actuators 470. The drive mechanism 482 is connected to a splined coupling 484 by transmission shafting 485 and a gear box 486. The splined coupling 484 terminates at the aft end of the sleeve section 462 at a gear box 488, which is coupled to flexible cable shafting 490. The flexible shafting 490 is connected to the actuators 470 at each end of the translating ring section 454. The drive mechanism 482 is thereby coupled to the ring actuators 470 to effect translation of the ring section 454.

The translating ring section 454 may be mounted in, for example, upper and lower guide structures 500 located at each end of the ring section 454. Each translating ring actuator 470 can be operably coupled with a guide structure 500, as discussed below with reference to FIG. 14.

FIG. 14 is a partial view of a guide 500 and associated actuator 470 at one end of the ring section 454. The thrust reverser sleeve section 462 forward of the ring section 454 can be connected to an axially extending beam 502 of the guide 500. The ring section 454 is mounted to a track bar 503 that is slidably mounted on the beam 502. The ring section 454 is thereby slidably mounted with respect to the sleeve section 462. The guide 500 includes a slider 504 that receives a screw shaft 506. The screw shaft 506 can be coupled to a gear box 508 that converts rotary movement of the flexible actuator cable 490 to rotary movement of the screw shaft 506. Rotation of the screw shaft 506 within the slider 504 translates the track 503 along the beam 502, which can be used to effect translation of the ring section 454 in the direction of the bidirectional arrow 458. The aforesaid described actuator system could be used in each of the actuator embodiments discussed elsewhere herein.

Figure 15:
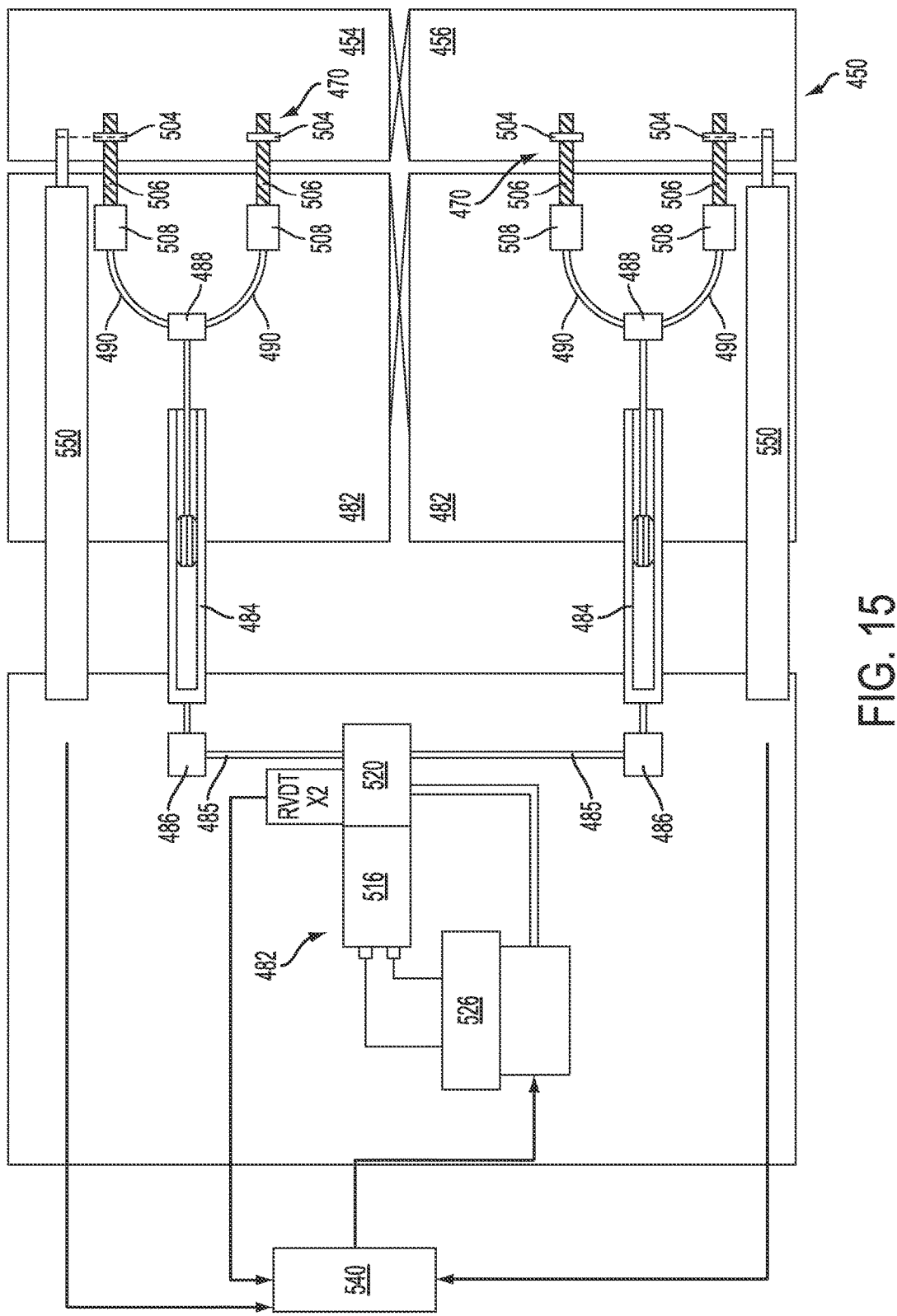
FIG. 15 is schematic illustration of an actuation system for the variable area nozzle assembly according to the third embodiment.

FIG. 15 is a schematic view of an actuation and control system that may be used to actuate translation of the translating ring assembly 450 illustrated in FIGS. 13 and 14. Referring specifically to FIG. 15 and also to FIGS. 13 and 14, the drive unit 482 can include a motor 516 coupled to a gear box 520. Rotational motion provided by the motor 516 is sequentially transmitted through the gear box 520, the transmission shafting 485, the gear boxes 486, the splined couplings 484, the actuator cable 490, and ultimately to the ring actuators 470 through the gear boxes 488 to provide axial translation of the ring sections 454, 456.

Referring to FIG. 15, the motor 516 can be coupled to a host controller unit 526, which is coupled to a full authority digital engine controller (FADEC) 540. The FADEC 540 can thereby control actuation of the ring sections 454, 456 of the translating ring assembly 450. The FADEC 540 can also control actuation of a thrust reverser. Linear variable differential transformers 550 can be coupled to the ring sections 454, 456 to provide position feedback to the FADEC 540.

Figure 16:
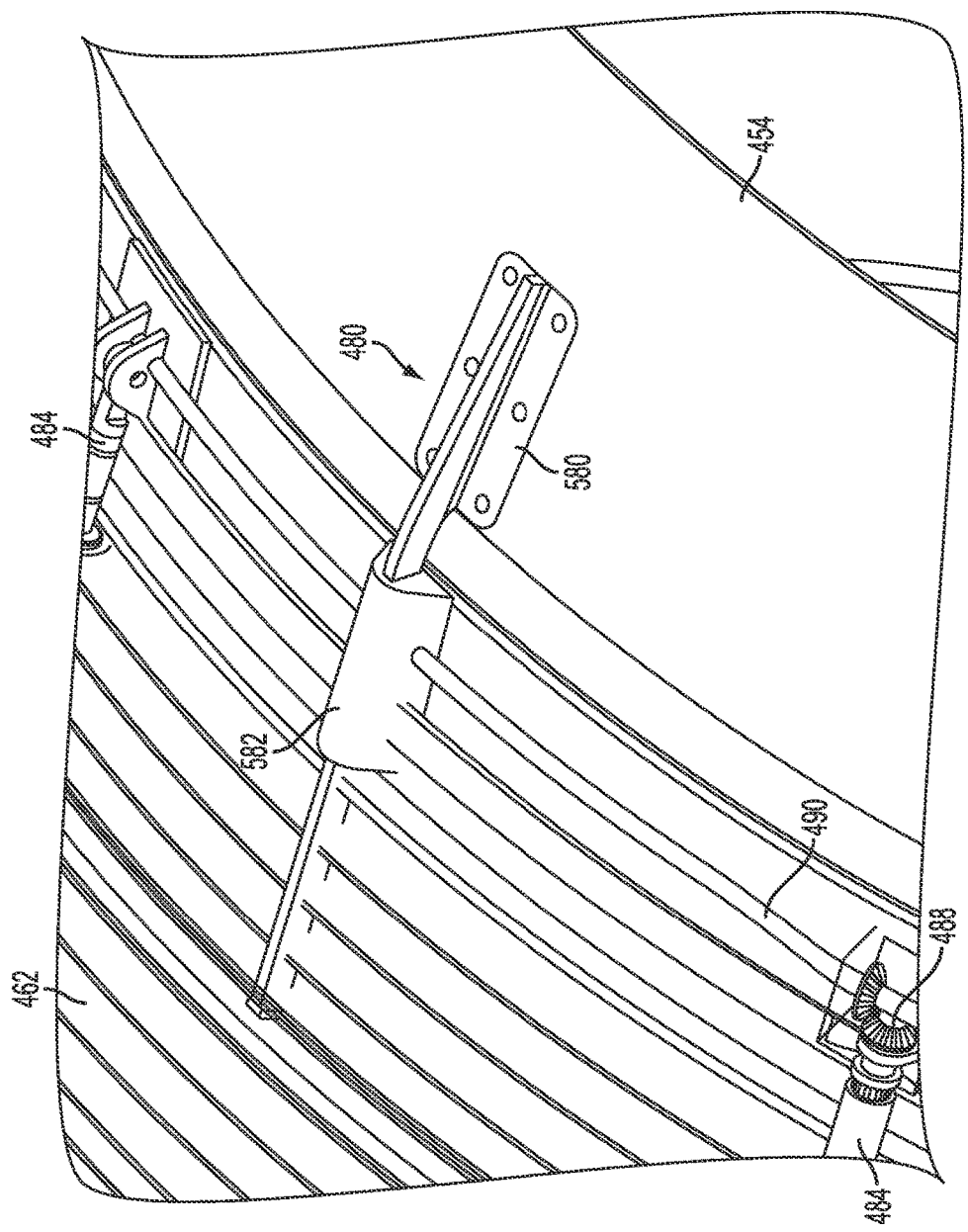
FIG. 16 is an isolated view of a stabilizer of the variable area nozzle assembly according to the third embodiment.

FIG. 16 is an isolated view of a stabilizer assembly 480. The stabilizer assembly 480 can include an aft portion 580 fixedly mounted to the translating ring section 454, and a guide portion 582 fixed to the translating sleeve 482 of the thrust reverser 480. The aft portion 580 can be axially slidable within the guide portion 582 with relatively low clearance to minimize unwanted translation and/or vibration (e.g., flutter) of the ring section 454.

Figure 17:
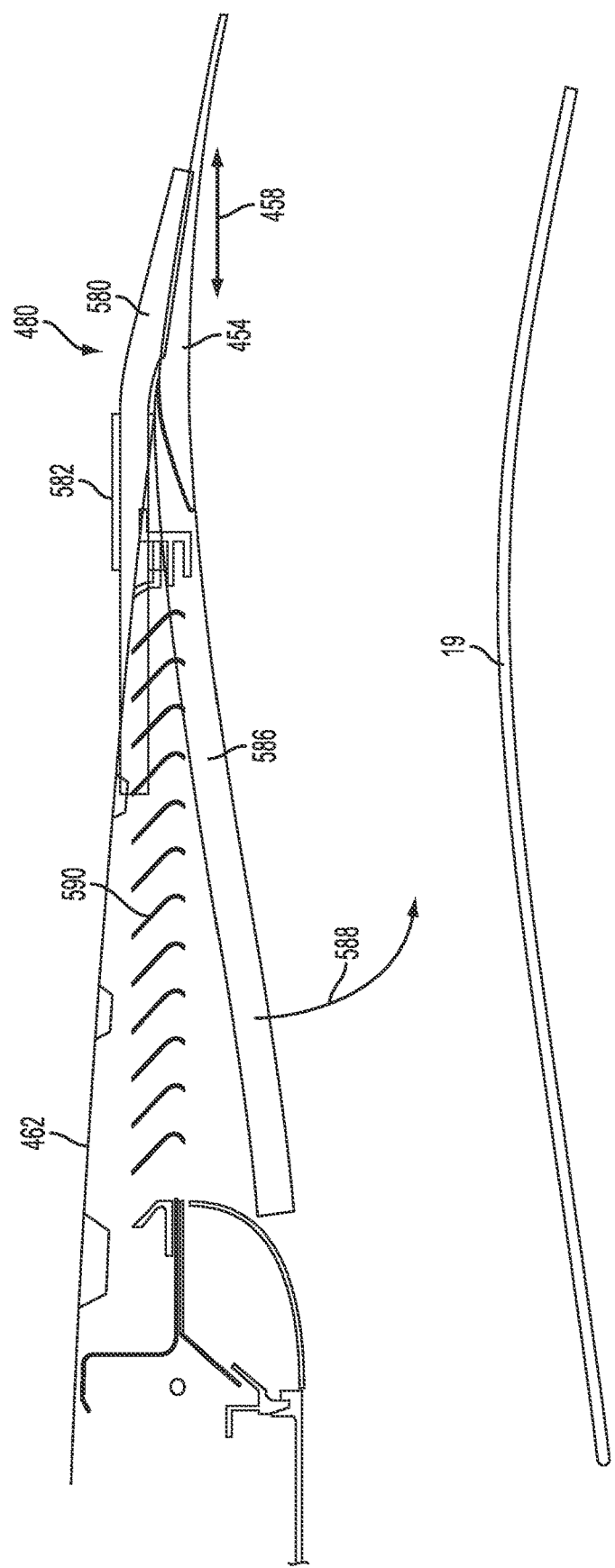
FIG. 17 is a section view of the variable area nozzle assembly according to the third embodiment.

FIG. 17 is a sectional partial view of a downstream portion of the nozzle assembly 412, taken along a longitudinal section that passes through a stabilizer assembly 480. The translating ring section 454 in FIG. 17 is translatable in the direction of the bidirectional arrow 458 to create an upstream exit forward of the section 454, as discussed above with reference to the embodiment illustrated in FIG. 8. Blocker doors 586 are operatively coupled to the first sleeve section 462 and pivotable in the direction of the curved arrow 588 thereby to block and redirect the bypass flow through cascade vanes 590 to produce a thrust reversing vector.

Figure 18:
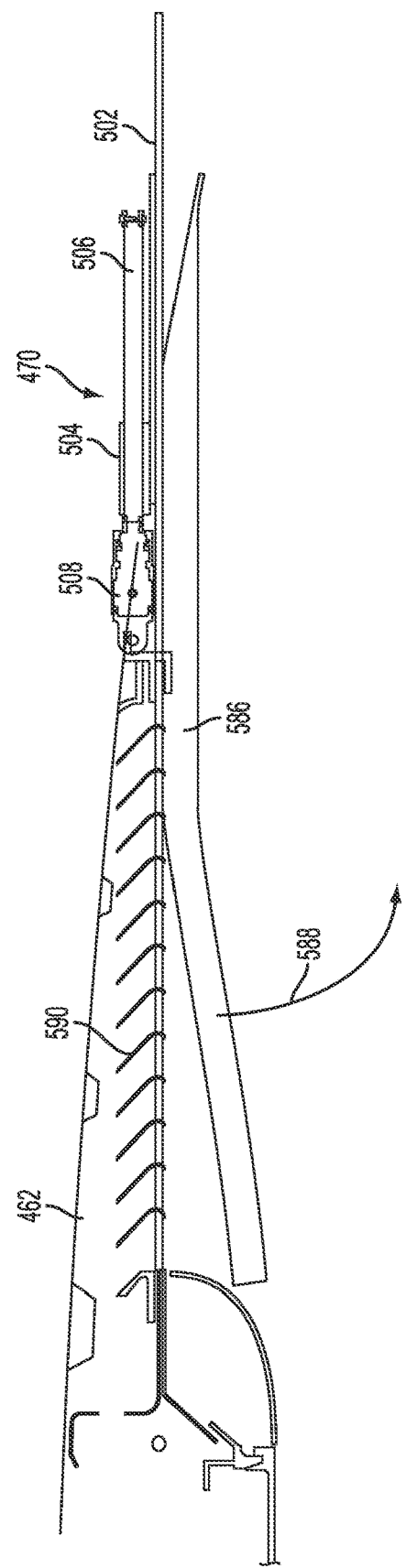
FIG. 18 is another section view of the variable area nozzle assembly according to the third embodiment.

FIG. 18 is a sectional partial view of a downstream portion of the nozzle assembly 412, taken along a longitudinal section that passes through a translating ring actuator 470 at one end of the translating ring section 454.

Figure 19:
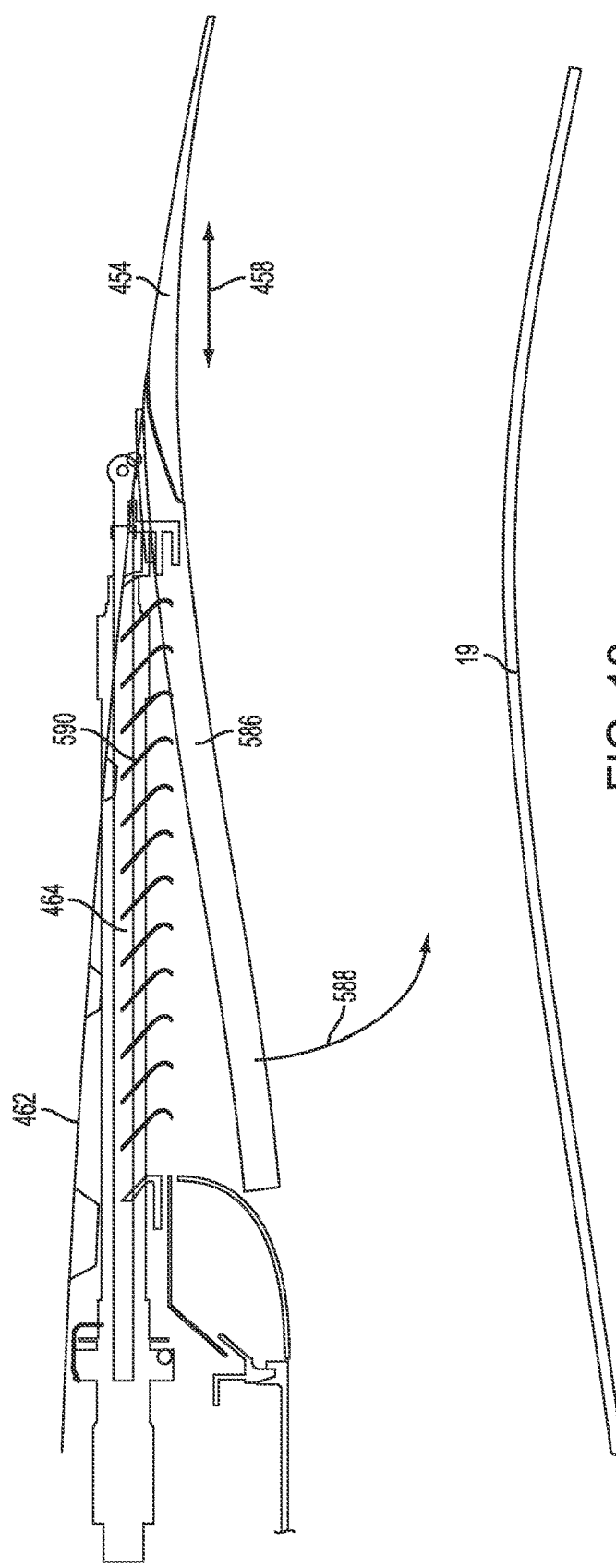
FIG. 19 is another section view of the variable area nozzle assembly according to the third embodiment.

FIG. 19 is a sectional partial view of a downstream portion of the nozzle assembly 412, taken along a longitudinal section that passes through an actuator 464 of the thrust reverser 460.

Figure 20:
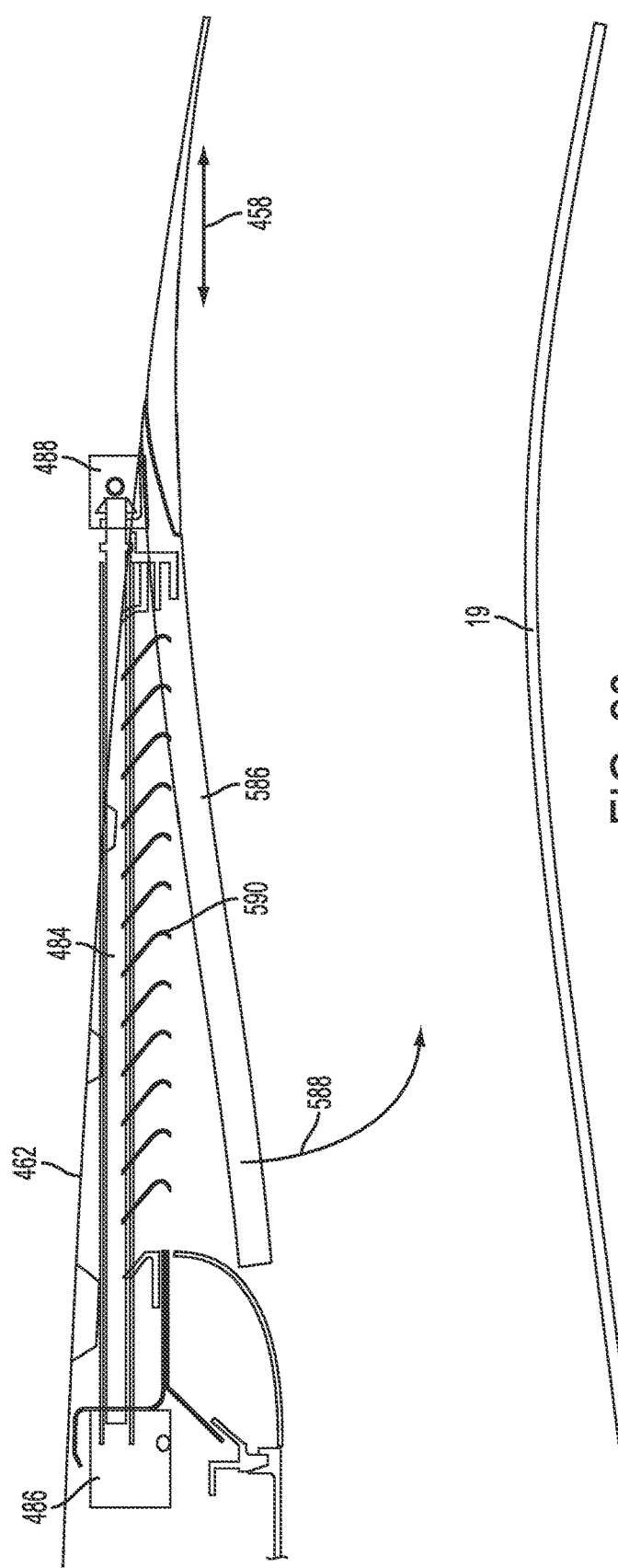
FIG. 20 is another section view of the variable area nozzle assembly according to the third embodiment.

FIG. 20 is a sectional partial view of a downstream portion of the nozzle assembly 412, taken along a longitudinal section that passes through a splined coupling 484.

FIGS. 21-26 illustrate a variable area nozzle assembly 612 according to a fourth embodiment of the invention. The nozzle assembly 612 may be mounted to a nacelle as generally illustrated in FIG. 1.

Figure 21:
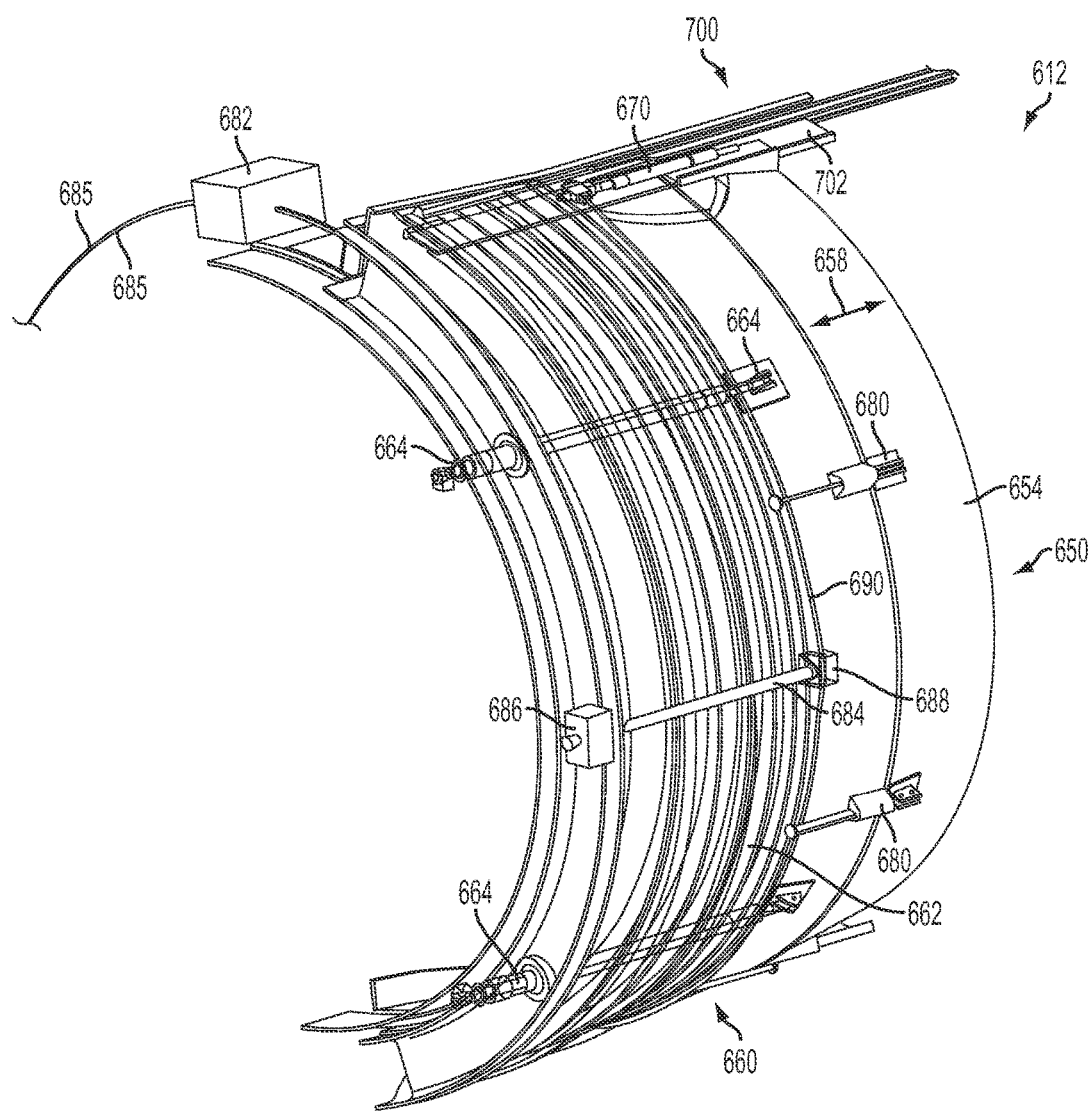
FIG. 21 is a partial exploded view of a variable area nozzle assembly according to a fourth embodiment of the invention.
Figure 22:
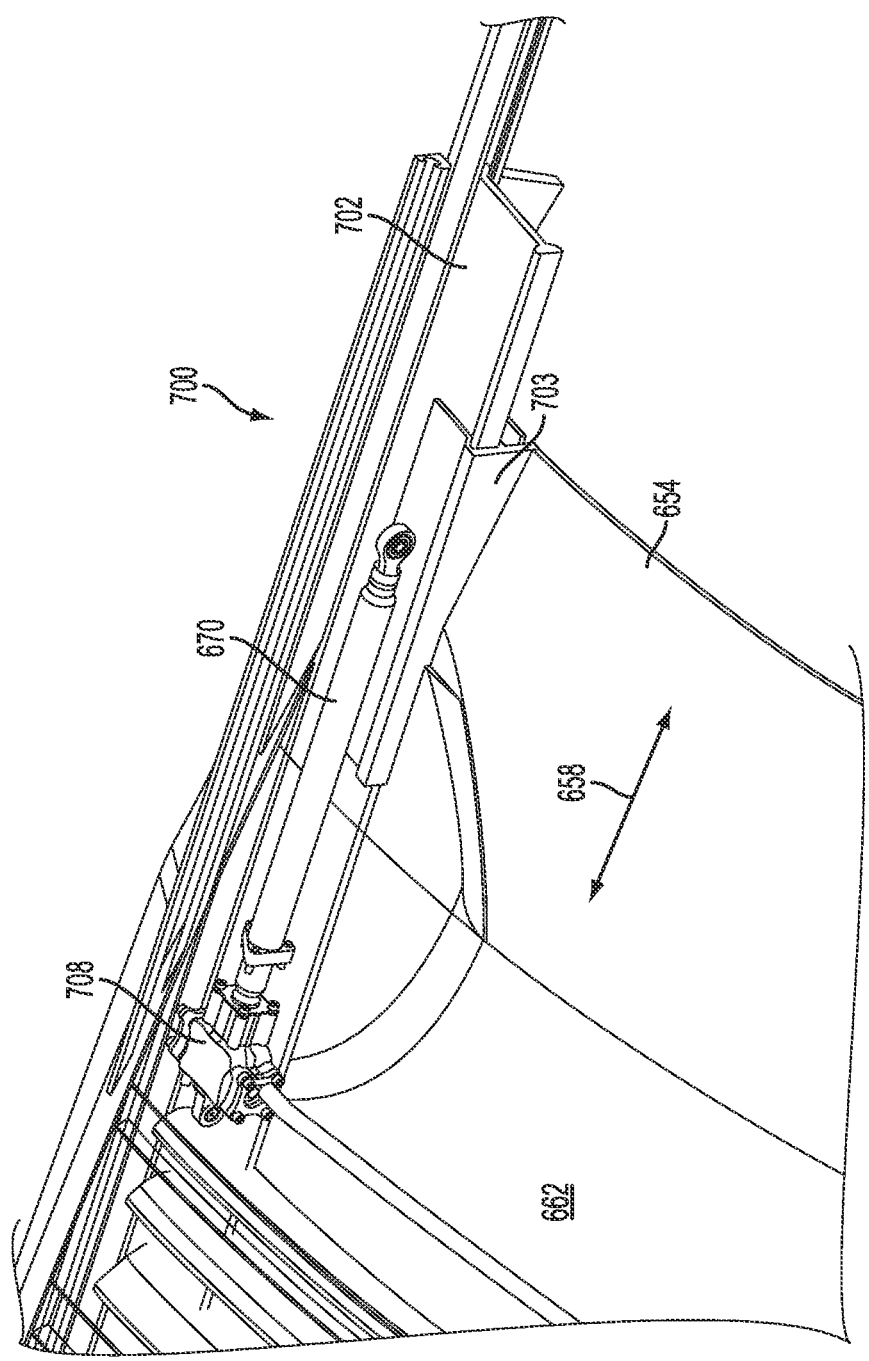
FIG. 22 is an isolated view of a guide structure of the variable area nozzle assembly according to the fourth embodiment.

FIG. 21 is a partially exploded, cutaway illustration of the variable area nozzle assembly 612, which has a translating ring assembly 650 at an aft end of the nozzle assembly. FIG. 22 is an isolated view of an actuator of the translating ring assembly 650. Translation of the translating ring assembly 650 can be effected by an actuation system such as, for example, the actuation system illustrated in FIG. 15. Referring to FIGS. 21 and 22, the translating ring assembly 650 can be comprised of two ring sections, of which a first ring section 654 is illustrated in FIG. 21. The second ring section (not illustrated) may be a mirror image of the ring section 654.

In FIG. 21, the first translating ring section 654 is in the closed position, with no upstream exit defined forward of the first section 654. The ring assembly 650 is mounted aft of a thrust reverser 660 comprising two translating sleeve sections, of which a first sleeve section 662 is illustrated in FIG. 21. The translating sleeve section 662 of the thrust reverser 660 can be translated by one or more actuators 664. The ring section 654 can be operated by an actuation system including actuators 670 located at each end of the ring section 654. Stabilizer assemblies 680 connecting the ring section 654 to the sleeve section 662 can be spaced along the periphery of the nozzle assembly 612 to reduce undesirable translation and/or vibration (e.g., flutter) of the ring section 654.

Still referring to FIG. 21, a motor or drive mechanism 682 governs the motion of the ring actuators 670. The drive mechanism 682 is connected to a splined coupling 684 by transmission shafting 685 and a gear box 686. The splined coupling 684 terminates at the aft end of the sleeve section 662 at a gear box 688, which is coupled to flexible cable shafting 690. The flexible cable shafting 690 is connected to the ring actuators 670 at each end of the translating ring section 654. The drive mechanism 682 is thereby coupled to the ring actuators 670 to effect translation of the ring section 654. The ring section 654 may be translatably mounted in, for example, upper and lower guide structures 700 located at each end of the ring section 654. Each actuator 670 can be operably coupled with a guide structure 700, as discussed below with reference to FIG. 22.

FIG. 22 is a partial view of a guide 700 and associated actuator 670 at one end of the ring section 654. The translating sleeve section 662 forward of the ring section 654 can be connected to an axially extending beam 702 of the guide 700. The ring section 654 is mounted to a track bar 703 that is slidably mounted on the beam 702. The first translating ring section 654 is thereby slidably mounted with respect to the first thrust reverser sleeve section 662. The ring actuator 670 is coupled at one end to a gear box 708 and at its opposite end to the track bar 703. The gear box 708 utilizes rotational motion of the flexible cable 690 to cause the actuator 670 to translate the ring section 654 in the direction of the bidirectional arrow 658.

Figure 23:
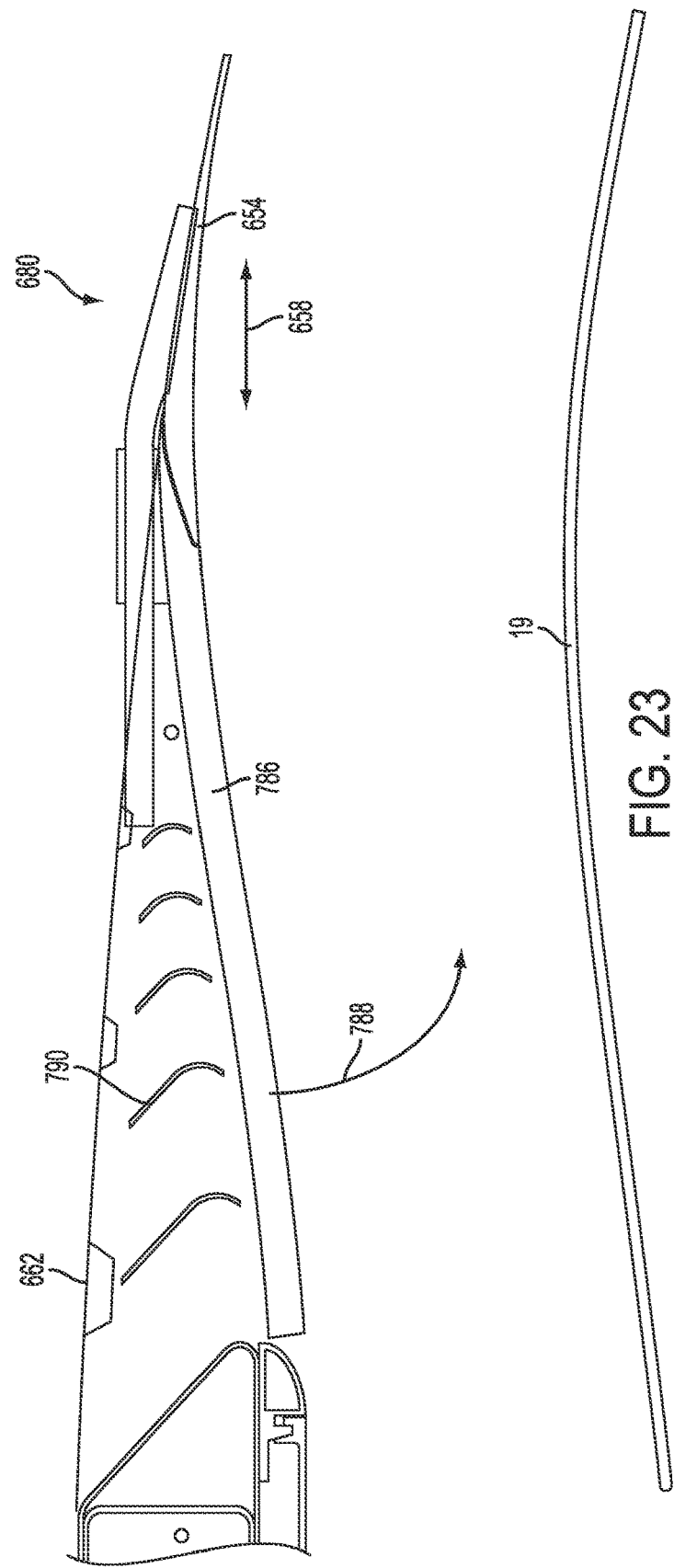
FIG. 23 is a section view of the variable area nozzle assembly according to the fourth embodiment.

FIG. 23 is a sectional partial view of a downstream portion of the nozzle assembly 612, taken along a longitudinal section that passes through one of the stabilizer assemblies 680. The translating ring section 654 illustrated in FIG. 23 is translatable in the direction of the bidirectional arrow 658 to create an upstream exit forward of the section 654, as discussed above with reference to the embodiment illustrated in FIG. 8. The thrust reverser 660 can include blocker doors 786 that are operatively coupled to the first sleeve section 662 and are pivotable in the direction of the curved arrow 788 thereby to block and redirect the bypass flow through variable depth cascade vanes 790 to produce a thrust reversing vector.

Figure 24:
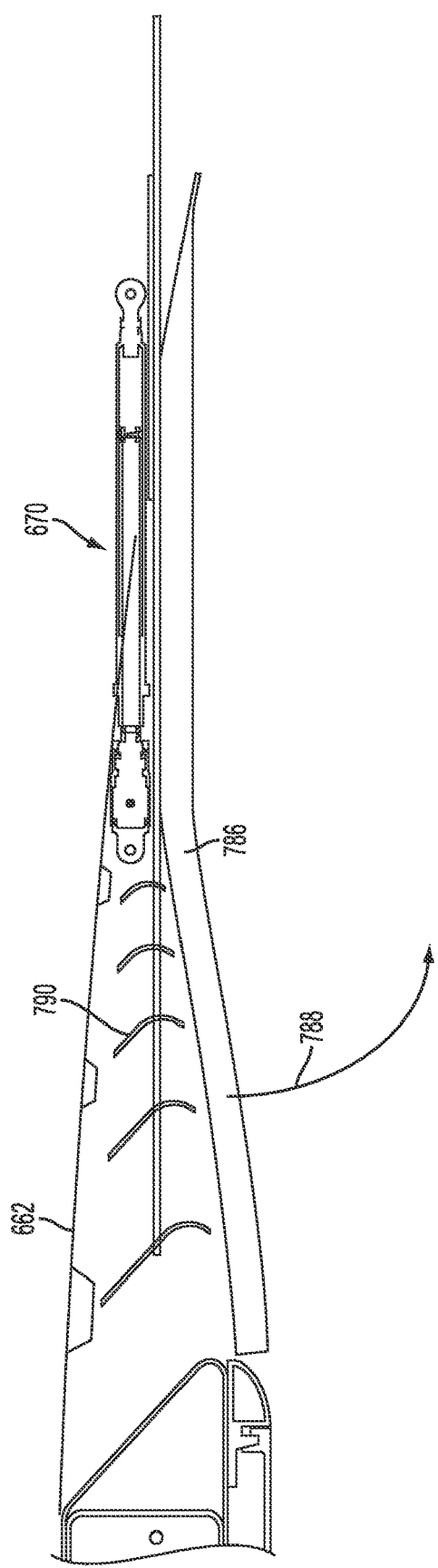
FIG. 24 is another section view of the variable area nozzle assembly according to the fourth embodiment.

FIG. 24 is a sectional partial view of a downstream portion of the nozzle assembly 612, taken along a longitudinal section that passes through an actuator 670 at one end of the translating ring section 654.

Figure 25:
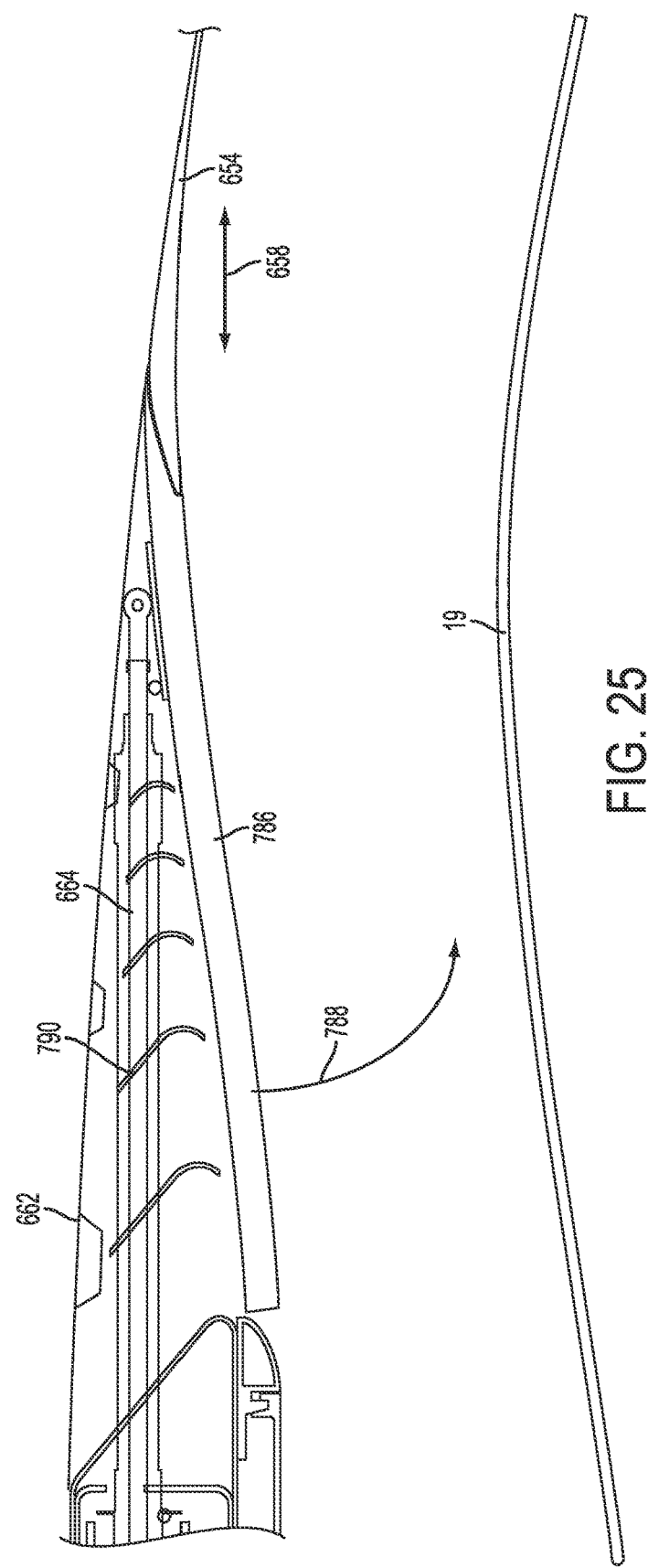
FIG. 25 is another section view of the variable area nozzle assembly according to the fourth embodiment.

FIG. 25 is a sectional partial view of a downstream portion of the nozzle assembly 612, taken along a longitudinal section that passes through an actuator 664 of the thrust reverser 660.

Figure 26:
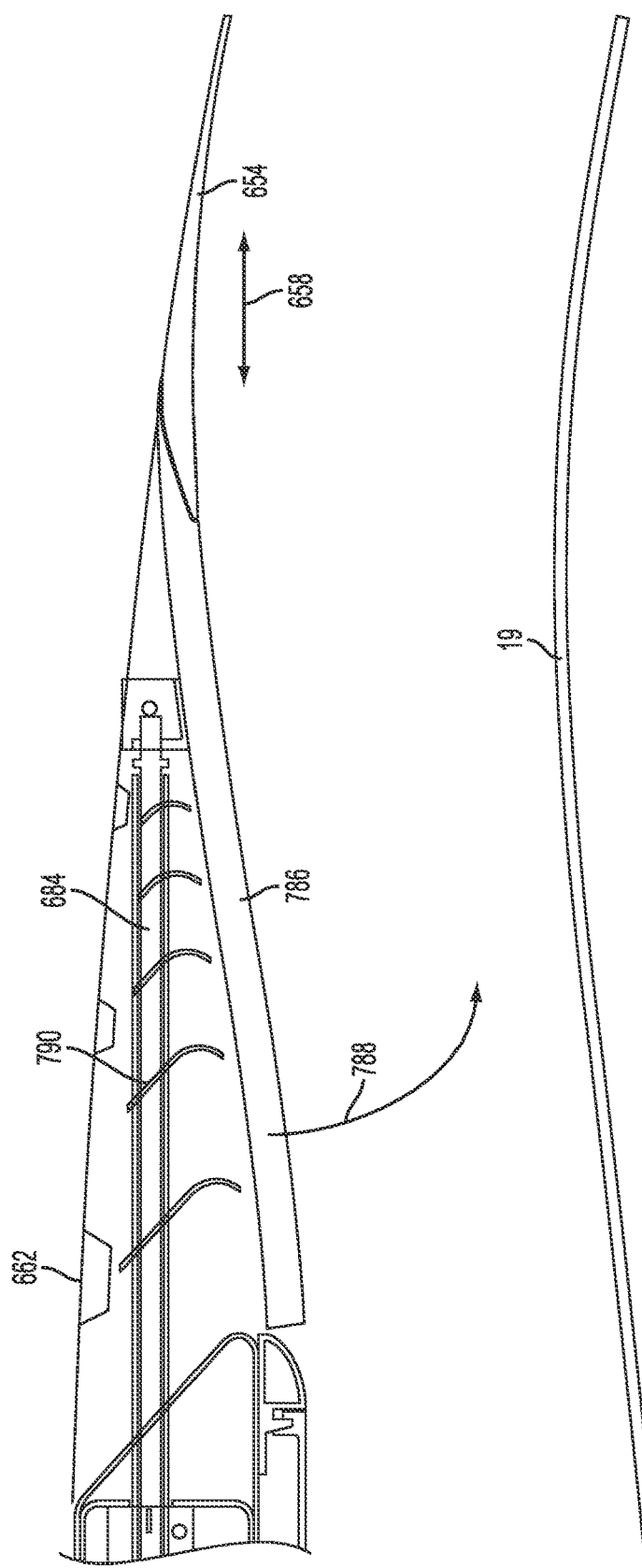
FIG. 26 is another section view of the variable area nozzle assembly according to the fourth embodiment.

FIG. 26 is a sectional partial view of a downstream portion of the nozzle assembly 612, taken along a longitudinal section that passes through a splined coupling 684.

Figure 27:
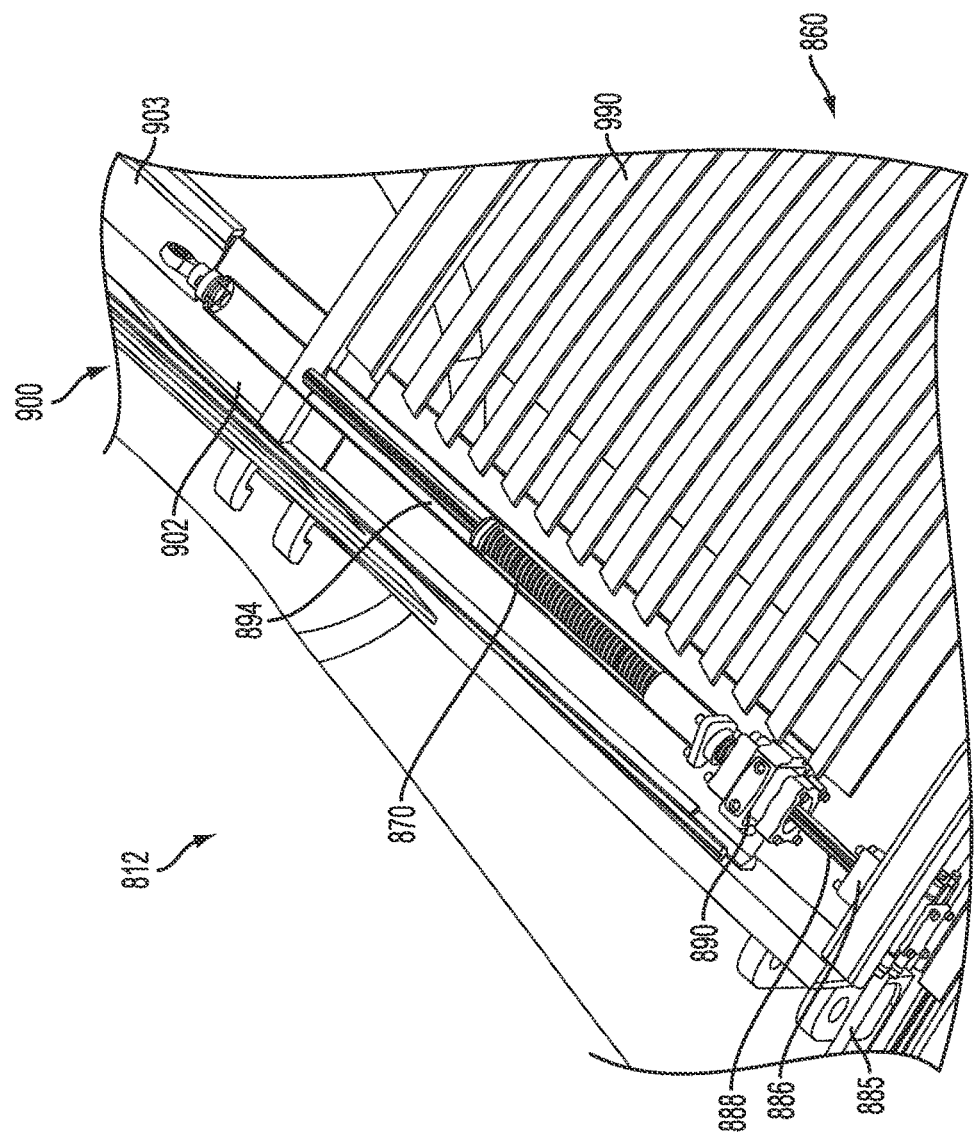
FIG. 27 is a partial exploded view of an actuator for a variable area nozzle assembly according to a fifth embodiment of the invention.

FIGS. 27-31 illustrate an actuator 870 for translating ring sections 854, 856 of a translating ring assembly 650 (illustrated schematically in FIG. 28) according to a fifth embodiment of the invention. Each translating ring section 854, 856 can include an actuator 870 at each end of the ring section. In FIG. 27, an actuator 870 is shown in a cutaway section of a portion of a variable area nozzle assembly 812. The variable area nozzle assembly 812 includes a thrust reverser 860 located forward of the translating ring assembly 650. The movable cowl or sleeve of the thrust reverser 860 is present but not shown in FIG. 27 for ease of illustration so that that cascade vanes 990 of the thrust reverser are visible. The translating ring assembly 650 and thrust reverser 860 of the nozzle assembly 812 can be, for example, generally similar in structure to those of the variable area nozzle assemblies 412, 612 discussed above. In FIG. 27, the thrust reverser 860 is in the stowed or non-deployed position.

Figure 28:
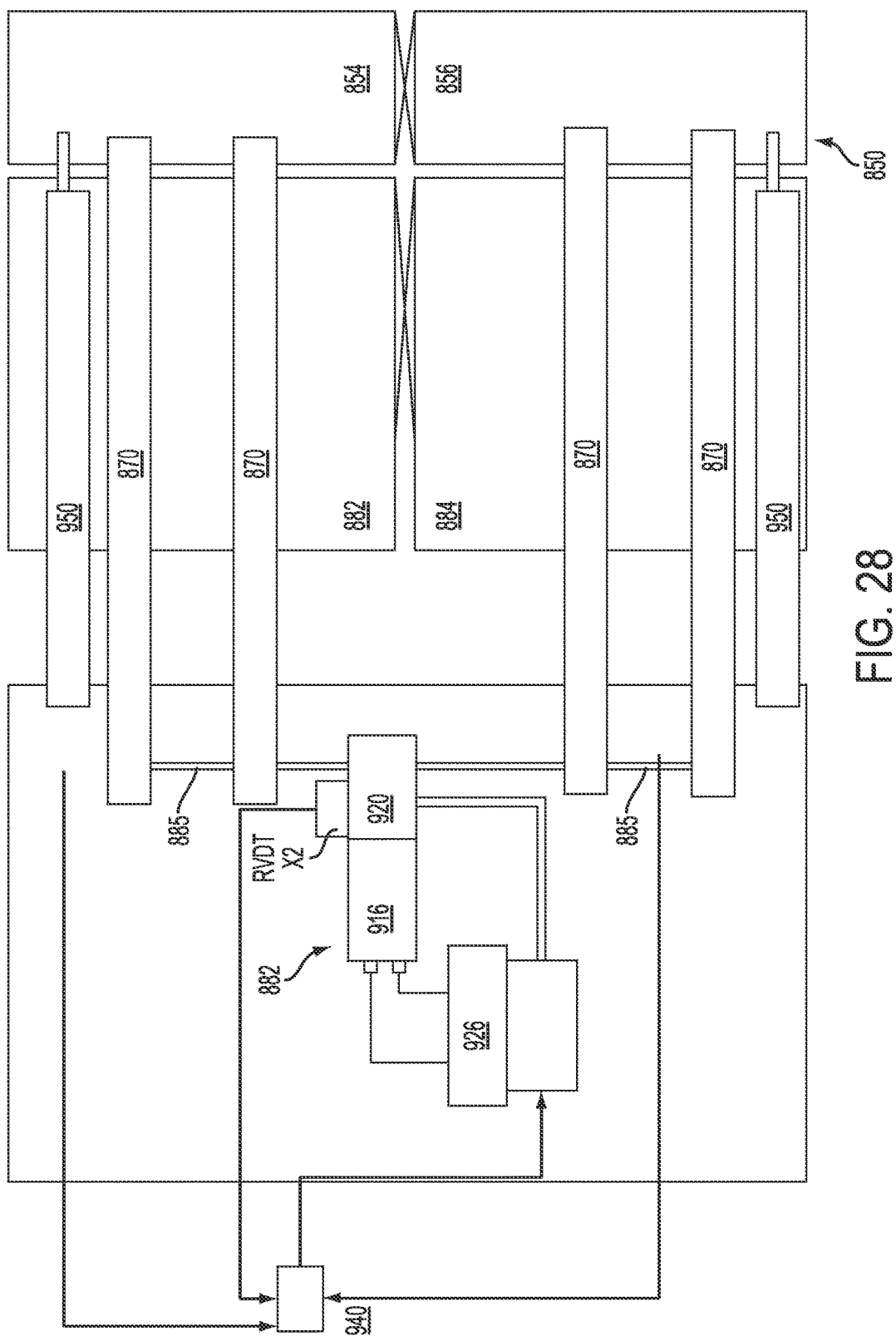
FIG. 28 is schematic illustration of an actuation system for the variable area nozzle assembly according to the fifth embodiment.

Referring to FIG. 27, the translating ring actuator 870 can include a bearing 886 that can be fixedly mounted forward of the thrust reverser 860. In the embodiment shown, the bearing 886 is coupled to an extensible shaft 888. The shaft 888 is coupled to a spline bush gimbal 890, which is coupled to a sliding spline 894. The sliding spline 894 is fixed to a track bar 903, which can be fixed to one end of the translating ring section 854 (FIG. 28). The track bar 903 is slidably mounted on a beam 702 that is fixed to a section of the thrust reverser 860. The first translating ring section 854 is thereby slidably mounted with respect to the thrust reverser 860. The bearing 886 at each end of the translating ring section 854 is coupled to transmission shafting 885. Rotation of the transmission shafting 885 effects translation of the ring section 854.

FIG. 28 is a schematic view of an actuation and control system that may be used with the translating ring assembly 850. Referring specifically to FIG. 28 and also to FIG. 27, a drive unit 882 can include a motor 916 coupled to a gear box 920. Rotation provided by the motor 916 is transmitted through the gear box 920 to the transmission shafting 885. The rotational motion from the transmission shafting 885 is utilized by the actuators 870 at each end of the ring sections 854, 856 to translate the ring sections.

The motor 916 can be coupled to a host controller unit 926, which is coupled to a full authority digital engine controller (FADEC) 940. The FADEC 940 can thereby control actuation of the translating ring sections 854, 856 of the translating ring assembly 850. The FADEC 940 can also control actuation of a thrust reverser. Linear variable differential transformers 950 can be coupled to the ring sections 854, 856 to provide position feedback information to the FADEC 940.

Figure 29A:
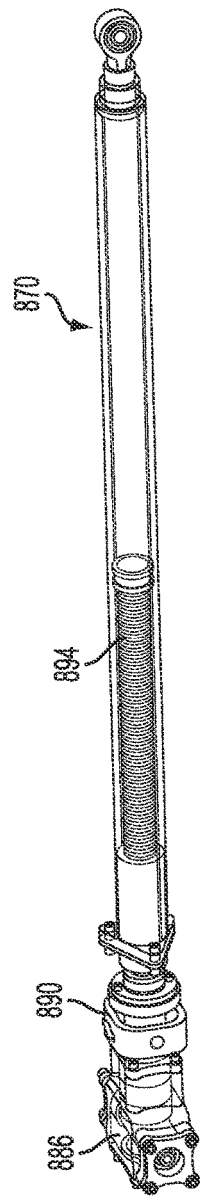
FIGS. 29A-29C illustrate the actuator according to the fifth embodiment of the invention in various modes of operation.
Figure 29B:
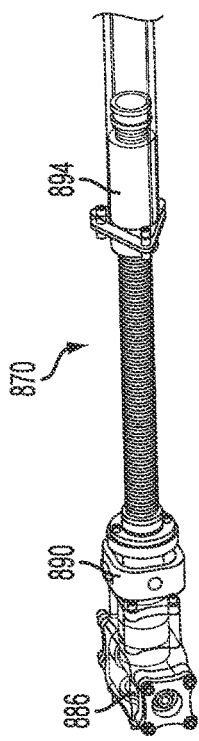
Figure 29C:
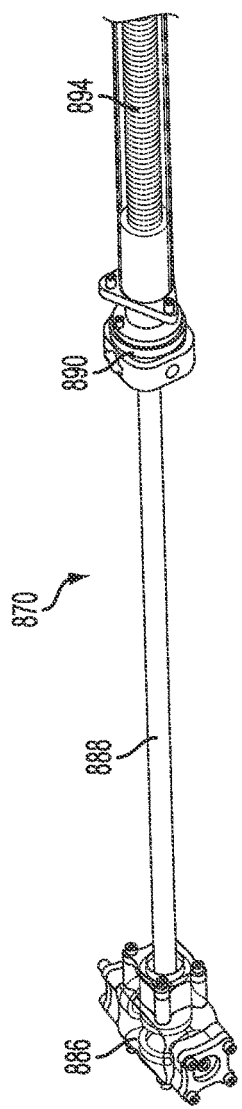

FIGS. 29A-29C illustrate an actuator 870 in three operational modes. In FIG. 29A, the actuator 890 is fully retracted, corresponding to an operating condition in which the translating ring assembly 850 and the thrust reverser 860 are stowed. In FIG. 29B, the actuator 890 is in a deployed state in which the translating ring assembly 850 is deployed and the thrust reverser 860 is stowed. FIG. 29C illustrates the actuator 890 where the thrust reverser 860 is deployed.

FIG. 30 is a sectional partial view of a downstream portion of the nozzle assembly 812, taken along a longitudinal section that passes through an actuator 870 at one end of the translating ring section 854. The translating ring section 854 is in a stowed position in FIG. 30.

FIG. 31 is a sectional partial view of a downstream portion of the nozzle assembly 812, taken along a longitudinal section that passes through an actuator 870 at one end of the translating ring section 854. The translating ring section 854 is in a deployed position in FIG. 31.

It will be understood by those skilled in the art that while the foregoing has been described with reference to preferred embodiments and features, various modifications, variations, changes and additions can be made thereto without departing from the spirit and scope of the invention. The optional elements in each of the embodiments may be employed with all possible combinations of other disclosed elements to form additional embodiments.

What is claimed:

1. A nacelle for a turbofan aircraft engine, the nacelle comprising:
    a stationary forward nacelle portion having an inlet end and an opposed aft end, the forward nacelle portion configured for mounting adjacent to a fan;
    a translating fan nozzle sleeve comprising a first arcuate fan nozzle sleeve portion having a first end and a second end, and a second arcuate fan nozzle sleeve portion having a third end and a fourth end; the fan nozzle sleeve being movably disposed aft of the forward nacelle portion, the fan nozzle sleeve being movable between a forward position, in which the first end of the first arcuate fan nozzle sleeve portion and the third end of the second arcuate fan nozzle sleeve portion are proximate to the aft end of the forward nacelle portion, and one or more extended positions in which a forward boundary of an upstream bypass flow exit is defined by the aft end of the stationary forward nacelle portion and an aft boundary of the upstream bypass flow exit is defined by the first end of the first arcuate fan nozzle sleeve portion and the third end of the second arcuate fan nozzle sleeve portion of the fan nozzle sleeve;
    a plurality of fan nozzle actuators extending from the stationary forward nacelle portion to the fan nozzle sleeve and being operable to selectively move the first arcuate fan nozzle sleeve portion between the forward position and the one or more extended positions, and wherein the fan nozzle actuators are operable to selectively move the second fan nozzle sleeve portion fan nozzle sleeve between the forward position and the one or more extended positions;
    a plurality of spaced extendable guide tubes, the guide tubes being separate from and circumferentially spaced apart from each of the fan nozzle actuators, and axially extending between the fan nozzle sleeve and the forward nacelle, the guide tubes being configured to permit longitudinal translating movement of the fan nozzle sleeve, and to inhibit movement of the fan nozzle sleeve in directions that are transverse to the direction of the longitudinal translating movement of the fan nozzle sleeve;
    a high pressure seal disposed between the aft edge of the forward nacelle portion and the first end of the first arcuate fan nozzle sleeve portion and the third end of the second arcuate fan nozzle sleeve portion; and a blister fairing extending along the aft end of the forward nacelle portion and comprising a plurality of upstream fairings each at least partially shrouding a respective actuator opening, and a plurality of downstream fairings each at least partially shrouding a portion of a respective fan nozzle actuator that is coupled to the fan nozzle sleeve, the downstream fairings disposed on an outer surface of the fan nozzle sleeve, the blister fairing at least partially overlapping the first end of the first arcuate fan nozzle sleeve portion and the third end of the second arcuate fan nozzle sleeve portion when the fan nozzle sleeve is in the forward position, and wherein each of the plurality of fan nozzle actuators extends through one of the respective actuator openings in the upstream blister fairings towards the fan nozzle sleeve.

2. A nacelle for a turbofan aircraft engine, the nacelle comprising:

a stationary forward nacelle portion having an inlet end and an opposed aft end, the forward nacelle portion configured for mounting adjacent to a fan;

a translating fan nozzle sleeve having comprising a first arcuate fan nozzle sleeve portion having a first end and a second end, and a second arcuate fan nozzle sleeve portion having a third end and a fourth end; the fan nozzle sleeve being movably disposed aft of the forward nacelle portion, the fan nozzle sleeve being movable between a forward position, in which the first end of the first arcuate fan nozzle sleeve portion and the third end of the second arcuate fan nozzle sleeve portion are proximate to the aft end of the forward nacelle portion, and one or more extended positions in which an upstream bypass flow exit is partially defined by the first end of the first arcuate fan nozzle sleeve portion and the third end of the second arcuate fan nozzle sleeve portion of the fan nozzle sleeve;

a plurality of fan nozzle actuators extending from the stationary forward nacelle portion to the fan nozzle sleeve and being operable to selectively move the first arcuate fan nozzle sleeve portion between the forward position and the one or more extended positions, and wherein the fan nozzle actuators are operable to selectively move the second fan nozzle sleeve portion between the forward position and the one or more extended positions;

a plurality of spaced extendable guide tubes, the guide tubes being separate from and circumferentially spaced apart from each of the fan nozzle actuators, and axially extending between the fan nozzle sleeve and a part of the nacelle located towards the inlet end, the guide tubes being configured to permit longitudinal translating movement of the fan nozzle sleeve, and to inhibit movement of the fan nozzle sleeve in directions that are transverse to the direction of the longitudinal translating movement of the fan nozzle sleeve;

a thrust reverser comprising:

(i) a cascade array of cascade vanes disposed aft of the forward nacelle portion;

(ii) a thrust reverser sleeve disposed aft of the forward nacelle portion, the thrust reverser sleeve being selectively movable between a stowed position and a deployed position, wherein in the stowed position the thrust reverser sleeve substantially covers the cascade vanes, and in the deployed position, at least a portion of the cascade vanes are not covered by the thrust reverser sleeve; and (iii) at least one thrust reverser actuator configured to selectively move the thrust reverser sleeve between the stowed position and the deployed position;

wherein the fan nozzle sleeve is disposed aft of the thrust reverser sleeve and is selectively movable between the forward position and the one or more extended positions, wherein a forward boundary of the upstream bypass flow exit is defined by an aft edge of the thrust reverser sleeve, and an aft boundary of the upstream bypass flow exit is defined by the first end of the first arcuate fan nozzle sleeve portion and the third end of the second arcuate fan nozzle sleeve portion of the fan nozzle sleeve when the fan nozzle sleeve is in the one or more extended positions;

a high pressure seal disposed between the aft edge of the thrust reverser sleeve and the first end of the first arcuate fan nozzle sleeve portion and the third end of the second arcuate fan nozzle sleeve portion; and a blister fairing extending along the aft end of the forward nacelle portion and comprising a plurality of upstream fairings each at least partially shrouding a respective actuator opening formed on an outer surface of the thrust reverser sleeve, and a plurality of downstream fairings each at least partially shrouding a portion of a respective fan nozzle actuator that is coupled to the fan nozzle sleeve, the downstream fairings disposed on an outer surface of the fan nozzle sleeve, the blister fairing at least partially overlapping the first end of the first arcuate fan nozzle sleeve portion and the third end of the second arcuate fan nozzle sleeve portion position when the fan nozzle sleeve is in the forward position, and wherein each of the plurality of fan nozzle actuators extends through one of the respective actuator openings in the upstream blister fairings towards the fan nozzle sleeve.

3. The nacelle according to claim 2, wherein:

the at least one thrust reverser actuator is extending from the forward nacelle portion to the thrust reverser sleeve, and/or a fan nozzle actuator of the plurality of fan nozzle actuators extends from the thrust reverser sleeve to the fan nozzle sleeve, and/or the fan nozzle actuator extends from the forward nacelle portion to the fan nozzle sleeve.

4. The nacelle according to claim 2, wherein:

the at least one thrust reverser actuator is extending from the forward nacelle portion to the thrust reverser sleeve.

5. The nacelle according to claim 2 further comprising:

a transverse bulkhead on the forward nacelle portion, wherein at least one of the thrust reverser sleeve and the fan nozzle sleeve are movably connected to the transverse bulkhead by means of:

a beam attached to the transverse bulkhead, the beam having at least a first guide track;

a first track bar attached to the thrust reverser sleeve, the first track bar being slidably engaged in the first guide track;

a second guide track attached to the thrust reverser sleeve; and a second track bar attached to the fan nozzle sleeve, the second track bar being slidably engaged in the second guide track.

6. The nacelle according to claim 2, wherein the thrust reverser sleeve comprises a first thrust reverser sleeve portion and a second thrust reverser sleeve portion, wherein the at least one thrust reverser actuator is operable to selectively move the first thrust reverser sleeve portion between the stowed position and the deployed position, and wherein at least one thrust reverser actuator is operable to selectively move the second thrust reverser sleeve portion between the stowed position and the deployed position.

7. The nacelle according to claim 2, wherein the plurality of spaced extendable guide tubes axially extend between the thrust reverser sleeve and the fan nozzle sleeve.

8. The nacelle according to claim 2, wherein the cascade array comprises a plurality of substantially parallel longitudinally spaced cascade vanes, wherein the cascade vanes comprise variable depths.

9. The nacelle according to claim 8, wherein the depths of the cascade vanes progressively decrease from a deepest forward-most vane to a shallowest aft-most vane.

10. The nacelle according to claim 2, wherein a fan nozzle actuator of the plurality of fan nozzle actuators comprises:
   a fan nozzle sleeve drive mechanism;
   a forward gear box operably connected to the fan nozzle sleeve drive mechanism, the forward gear box being located forward of the thrust reverser sleeve;
   an aft gear box positioned proximate to a front edge of a first fan nozzle sleeve segment;
   a splined coupling rotatably connecting the forward gear box to the aft gear box, the splined coupling being axially extendable; and
   at least one actuator cable operably connecting at least a portion of the at least one fan nozzle actuator to the aft gear box;
   whereby the fan nozzle sleeve drive mechanism is operably coupled to at least a portion of the fan nozzle actuator and is capable of effecting translation of the first fan nozzle sleeve segment between its forward and extended positions.

11. The nacelle according to claim 10, wherein the fan nozzle sleeve drive mechanism comprises a motor coupled to a motor gear box, the motor gear box being operably connected to the forward gear box, wherein selective rotation of the motor causes rotation of the forward gear box and actuation of the of the at least one fan nozzle sleeve actuator.

12. The nacelle according to claim 11 further comprising at least one controller coupled to the motor, the controller being configured to selectively control translation of the first fan nozzle sleeve portion and a second fan nozzle sleeve portion.

13. The nacelle according to claim 12 further comprising an upper guide structure slidably supporting the upper ends of the first and second fan nozzle sleeve portions, and a lower guide structure slidably supporting the lower ends of the first and second fan nozzle sleeve portions.

* * * * *

UNITED STATES PATENT AND TRADEMARK OFFICE
CERTIFICATE OF CORRECTION

PATENT NO. : 9,970,387 B2
APPLICATION NO. : 12/672565
DATED : May 15, 2018
INVENTOR(S) : Joel Hudson Frank et al.

Page 1 of 1

It is certified that error appears in the above-identified patent and that said Letters Patent is hereby corrected as shown below:

In the Claims

In Column 14, Line 38, delete "sleeve, and/or a fan nozzle actuator of the plurality of fan nozzle actuators extends from the thrust reverser sleeve to the fan nozzle sleeve, and/or the fan nozzle actuator extends from the forward nacelle portion to the fan nozzle sleeve" and therefore insert --sleeve.--

In Column 14, Line 45, delete "The nacelle according to claim 2, wherein: the at least one thrust reverser actuator is extending from the forward nacelle portion to the thrust reverser sleeve." and therefore insert --The nacelle according to claim 37, wherein a fan nozzle actuator from the plurality of fan nozzle actuators and/or the at least one thrust reverser actuator comprises at least one mechanical, electrical, hydraulic or pneumatic device.--

Signed and Sealed this
Eleventh Day of June, 2019

Andrei Iancu
*Director of the United States Patent and Trademark Office*